United States Patent [19]

Ogawa

[11] Patent Number: 5,347,598
[45] Date of Patent: Sep. 13, 1994

[54] IMAGE PROCESSING APPARATUS

[75] Inventor: Masami Ogawa, Tokyo, Japan

[73] Assignee: Canon Kabushiki Kaisha, Tokyo, Japan

[21] Appl. No.: 47,354

[22] Filed: Apr. 19, 1993

Related U.S. Application Data

[63] Continuation of Ser. No. 632,611, Dec. 26, 1990, abandoned, which is a continuation of Ser. No. 169,611, Mar. 17, 1988, abandoned.

[30] Foreign Application Priority Data

| Mar. 20, 1987 | [JP] | Japan | 62-64368 |
| Mar. 20, 1987 | [JP] | Japan | 62-64369 |
| Nov. 16, 1987 | [JP] | Japan | 62-287498 |
| Nov. 16, 1987 | [JP] | Japan | 62-287499 |

[51] Int. Cl.⁵ .............................................. G06K 9/20
[52] U.S. Cl. ............................................... 382/48; 382/1; 382/22
[58] Field of Search .................... 382/13, 29, 61, 1, 48, 382/22; 355/122

[56] References Cited

U.S. PATENT DOCUMENTS

| 4,504,969 | 3/1985 | Suzuki et al. | 382/48 |
| 4,533,959 | 8/1985 | Sakurai | 382/61 |
| 4,566,126 | 1/1986 | Miyagawa et al. | 382/61 |
| 4,672,461 | 6/1987 | Yoshida | 358/280 |
| 4,692,810 | 9/1987 | Machii et al. | 358/280 |
| 4,701,805 | 10/1987 | Maeshima | 358/280 |
| 4,742,399 | 5/1988 | Kitamura | 358/280 |
| 4,775,886 | 10/1988 | Hirosawa | 358/280 |
| 4,788,578 | 11/1988 | Tamura et al. | 358/280 |
| 4,823,395 | 4/1989 | Chikauchi | 382/61 |

Primary Examiner—David K. Moore
Assistant Examiner—D. R. Anderson
Attorney, Agent, or Firm—Fitzpatrick, Cella, Harper & Scinto

[57] ABSTRACT

In an image processing apparatus, an original image is extracted in the form of line segments divided by characteristic points, the extracted line segments are classified in accordance with the lengths of line segments connected to the characteristic points, and a frame is made in accordance with classification results.

78 Claims, 31 Drawing Sheets

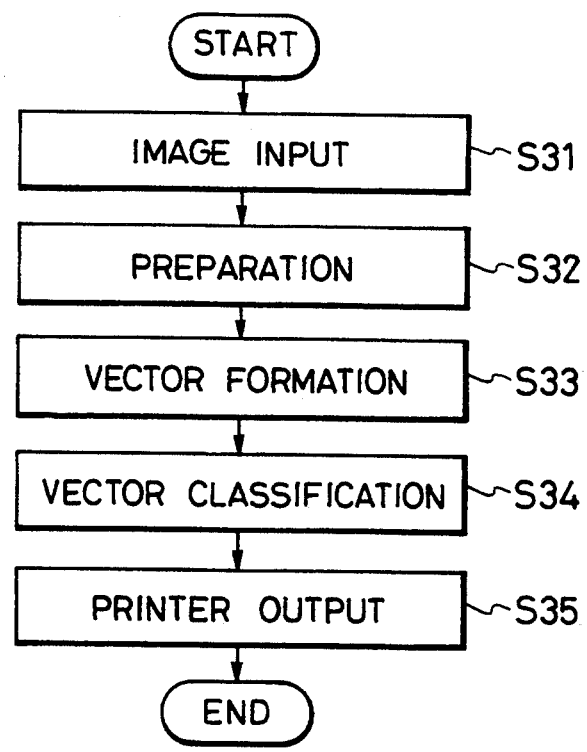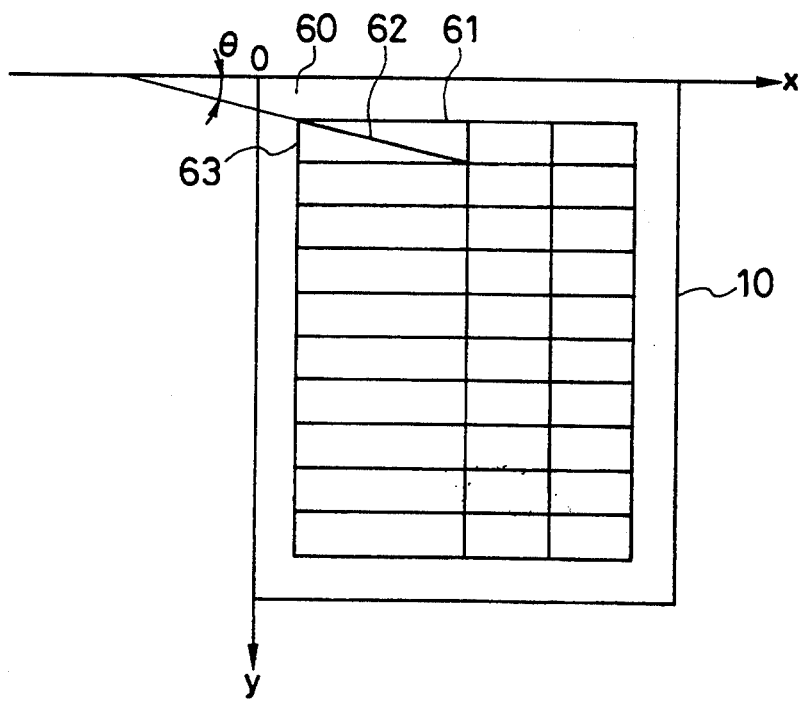

FIG. 9

| CHARACTERISTIC POINT NO. $P_i$ | X | Y |
|---|---|---|
| $P_1$ | | |
| $P_2$ | | |
| ⋮ | | |
| $P_{M-1}$ | | |
| $P_M$ | | |

FIG. 10

| VECTOR NO. $V_i$ | INITIAL POINT | TERMINAL POINT | SLOPE θ | CLASSIFICATION k |
|---|---|---|---|---|
| $V_1$ | $P_1$ | $P_2$ | $θ_1$ | $k_1$ |
| $V_2$ | | | | |
| $V_3$ | | | | |
| ⋮ | | | | |
| $V_N$ | | | $θ_N$ | $k_N$ |

FIG. 11

| VECTOR NO. $V_k$ |
|---|
| V |
| V |
| ⋮ |
| $V_L$ |

FIG. 17

| k \ L | MODE 0 | | | | MODE 1 | | |
|---|---|---|---|---|---|---|---|
| | 0 | 2 | 3 | 4 | 2 | 6 | 12 |
| 2 | ⌐ | NONE | NONE | NONE | ⌐ | NONE | NONE |
| 3 | ↘→↓ | ⊥ | NONE | NONE | ↘→↓ | ⊥ | NONE |
| 4 | NONE | ⊢↗ | NONE | + | NONE | ⊢↗ | ↔ |
| 5 | NONE | NONE | NONE | ↔↗ | NONE | NONE | ↔↗ |

FIG. 23
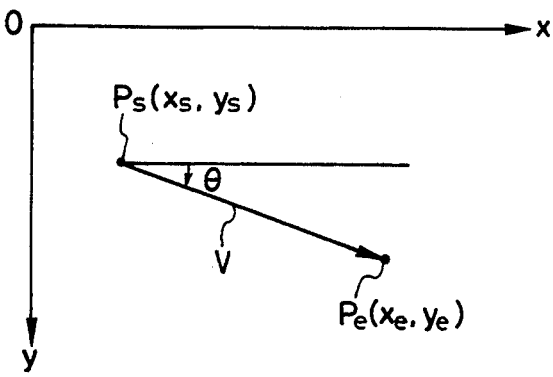
FIG. 24
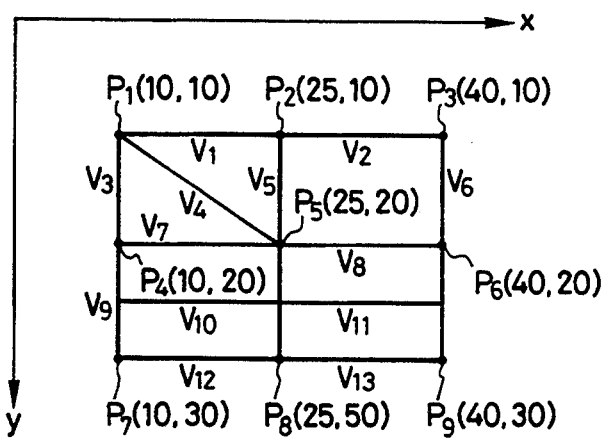
FIG. 25
| VECTOR NO. 92 | INITIAL x 93 | INITIAL y 94 | TERMINAL x 95 | TERMINAL y 96 | ANGLE θ 97 |
|---|---|---|---|---|---|
| $V_1$ | 10 | 10 | 25 | 10 | 0 |
| $V_2$ | 25 | 10 | 40 | 10 | 0 |
| $V_3$ | 10 | 10 | 10 | 20 | 90 |
| $V_4$ | 10 | 10 | 25 | 20 | 36 |
| $V_5$ | 25 | 10 | 25 | 20 | 90 |
| $V_6$ | 40 | 10 | 40 | 20 | 90 |
| $V_7$ | 10 | 20 | 25 | 20 | 0 |
| $V_8$ | 25 | 20 | 40 | 20 | 0 |
| $V_9$ | 10 | 20 | 10 | 30 | 90 |
| $V_{10}$ | 25 | 20 | 25 | 30 | 90 |
| $V_{11}$ | 40 | 20 | 40 | 30 | 90 |
| $V_{12}$ | 10 | 30 | 25 | 30 | 0 |
| $V_{13}$ | 25 | 30 | 40 | 30 | 0 |
91

FIG. 26A

| VECTOR | POINT NO. (INITIAL) | POINT NO. (TERMINAL) |
|---|---|---|
| $V_1$ | $P_1$ | $P_2$ |
| $V_2$ | $P_2$ | $P_3$ |
| $V_3$ | $P_1$ | $P_4$ |
| $V_4$ | $P_1$ | $P_5$ |
| $V_5$ | $P_2$ | $P_5$ |
| $V_6$ | $P_3$ | $P_6$ |
| $V_7$ | $P_4$ | $P_5$ |
| $V_8$ | $P_5$ | $P_6$ |
| $V_9$ | $P_4$ | $P_7$ |
| $V_{10}$ | $P_5$ | $P_8$ |
| $V_{11}$ | $P_6$ | $P_9$ |
| $V_{12}$ | $P_7$ | $P_8$ |
| $V_{13}$ | $P_8$ | $P_9$ |

FIG. 26B

| POINT NO. | x | y | VECTOR LIST NO. |
|---|---|---|---|
| $P_1$ | 10 | 10 | $L_1$ |
| $P_2$ | 25 | 10 | $L_4$ |
| $P_3$ | 40 | 10 | $L_7$ |
| $P_4$ | 10 | 20 | $L_9$ |
| $P_5$ | 25 | 20 | $L_2$ |
| $P_6$ | 40 | 20 | $L_7$ |
| $P_7$ | 10 | 30 | $L_{20}$ |
| $P_8$ | 25 | 30 | $L_{22}$ |
| $P_9$ | 40 | 30 | $L_{25}$ |

FIG. 26C

| VECTOR LIST NO. | VECTOR NO. | NEXT VECTOR LIST NO. |
|---|---|---|
| $L_1$ | $V_1$ | $L_2$ |
| $L_2$ | $V_3$ | $L_3$ |
| $L_3$ | $V_4$ | 0 |
| $L_4$ | $V_1$ | $L_5$ |
| $L_5$ | $V_2$ | $L_6$ |
| $L_6$ | $V_5$ | 0 |
| $L_{25}$ | $V_{11}$ | $L_{26}$ |
| $L_{26}$ | $V_{13}$ | 0 |

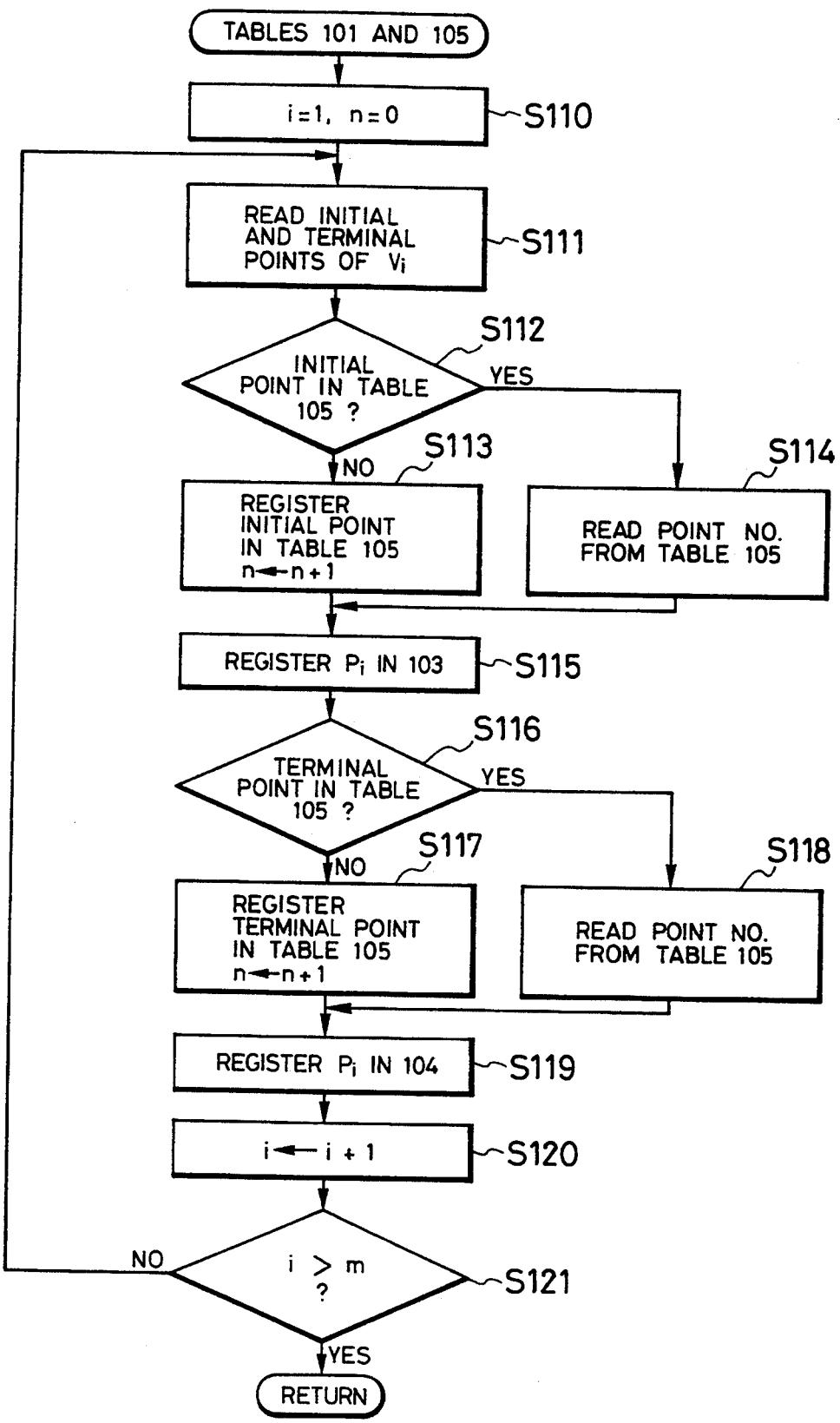

| FRAME NO. 131 | VECTOR (UPPER) 132 | VECTOR (LEFT) 133 | VECTOR (RIGHT) 134 | VECTOR (LOWER) 135 | VECTOR (↘) 136 | VECTOR (↗) 137 |
|---|---|---|---|---|---|---|
| $W_1$ | $V_1$ | $V_3$ | $V_5$ | $V_7$ | $V_4$ | 0 |
| $W_2$ | $V_2$ | $V_5$ | $V_6$ | $V_8$ | 0 | 0 |
| $W_3$ | $V_7$ | $V_9$ | $V_{10}$ | $V_{12}$ | 0 | 0 |
| $W_4$ | $V_8$ | $V_{10}$ | $V_{11}$ | $V_{13}$ | 0 | 0 |

130

| FRAME NO. 141 | x 142 | y 143 | w 144 | h 145 | KIND 146 |
|---|---|---|---|---|---|
| $W_1$ | 10 | 10 | 15 | 10 | $K_1$ |
| $W_2$ | 25 | 10 | 15 | 10 | $K_0$ |
| $W_3$ | 10 | 20 | 15 | 10 | $K_0$ |
| $W_4$ | 25 | 20 | 15 | 10 | $K_0$ |

140

150  151  152  153

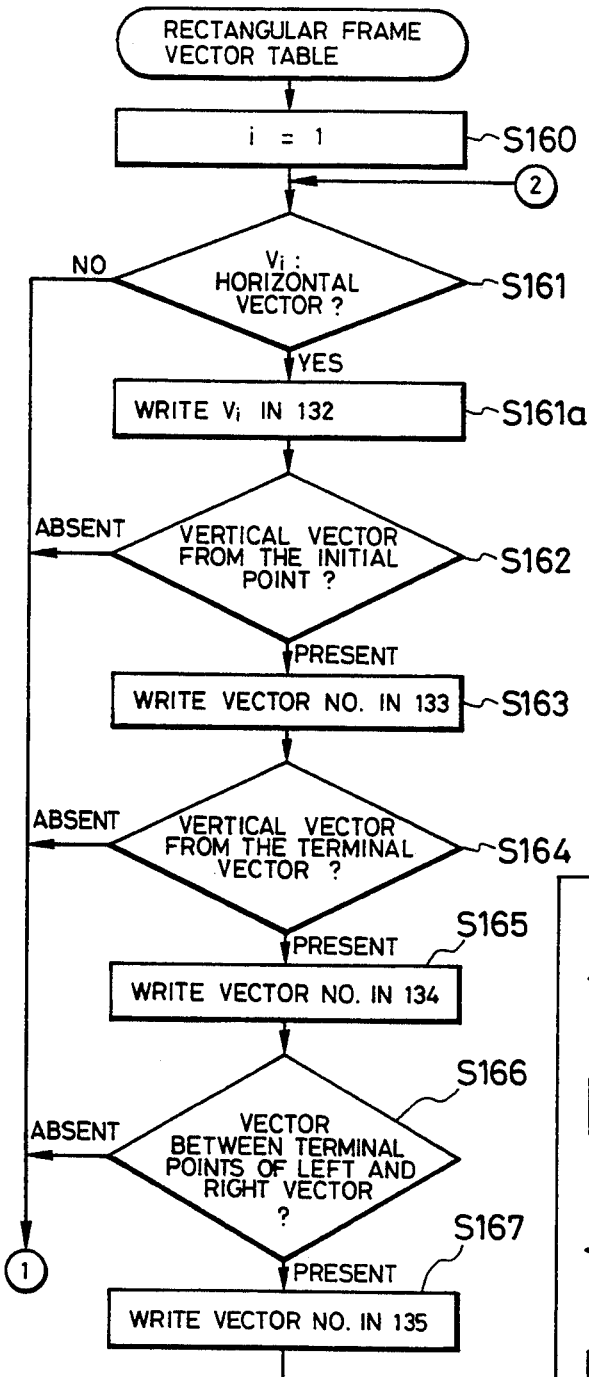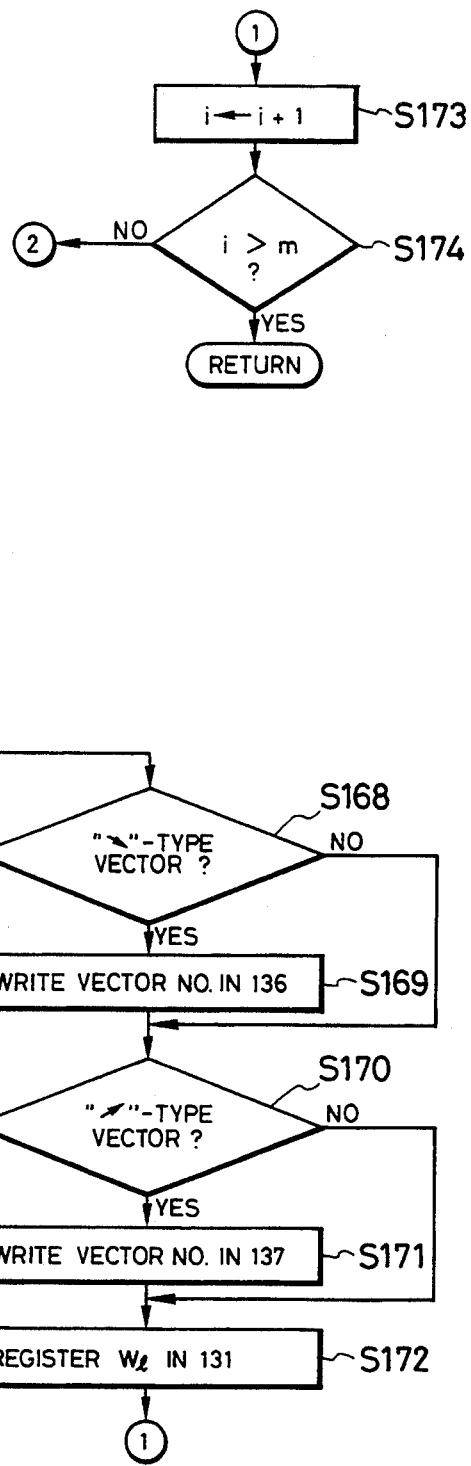
FIG. 32A
FIG. 32B

FIG. 43

| | a | b | c | d |
|---|---|---|---|---|
| A | 10 | 20 | 30 | 40 |
| B | 5 | 10 | 15 | 20 |

Cells labeled: C1,1 C1,2 C1,3 C1,4 C1,5 / C2,1 C2,2 C2,3 C2,4 C2,5 / C3,1 C3,2 C3,3 C3,4 C3,5

FIG. 45

| FRAME NO. | ROW | COLUMN |
|---|---|---|
| $W_1$ | 1 | 1 |
| $W_2$ | 1 | 2 |
| $W_3$ | 1 | 3 |
| ⋮ | | |
| $W_3$ | 3 | 5 |

291 = FRAME NO.; 292 = ROW/COLUMN; 290

FIG. 46

| ROW | COLUMN | CHARACTER CODE |
|---|---|---|
| 1 | 1 | |
| 1 | 2 | a |
| 1 | 3 | b |
| ⋮ | ⋮ | ⋮ |
| 2 | 1 | 10 |
| 2 | 2 | 20 |
| ⋮ | ⋮ | ⋮ |
| 3 | 4 | 15 |
| 3 | 5 | 20 |

301 = ROW/COLUMN; 302 = CHARACTER CODE; 300

IMAGE PROCESSING APPARATUS

This application is a continuation of application Ser. No. 07/632,611 filed Dec. 26, 1990, now abandoned, which is a continuation of application Ser. No. 07/169,611, filed Mar. 17, 1988, now abandoned.

BACKGROUND OF THE INVENTION

Field of the Invention

The present invention relates to an image processing apparatus for generating table frame straight lines by processing aft image.

The present invention also relates to an image processing apparatus capable of recognizing tilted lines in a table free.

The present invention further relates to an image processing apparatus for generating table frame straight lines by processing an original image including arbitrary curves in handwritten and printed images and the like.

Additionally, the present invention relates to an image processing apparatus for reading an image of a table frame and recognizing rectangular areas.

The present invention also relates to an image processing apparatus for generating table frame lines by processing an original image and for performing numerical operations in a table on the basis of the table frame lines.

Related Background Art

Vector formation by inputting a digital original image and tracing line pixels is known as a conventional method of recognizing a frame image constituted by horizontal lines, vertical lines, and tilted lines, as shown in FIG. 4. In a conventional system for recognizing that lines obtained by vector formation are horizontal, vertical, and tilted lines a slope $\theta$ of each line is calculated and is compared with a predetermined threshold value $\theta_{th}$ to identify these lines in the following manner.

Vertical line: $|\theta| \geq 90° - \theta_{th}$

Tilted line: $\theta_{th} \geq |\theta| < 90° - \theta_{th}$

Horizontal line: $0 \leq |\theta| < \theta_{th}$     (1)

However, it is very difficult to determine the threshold value $\theta_{th}$ in the conventional case. When the slopes $\theta$ of vectors are classified in the range of $-90°$ to $90°$, the following results are derived from conditions (1). Assume that the threshold value $\theta_{th} = 30°$. Under this assumption, if a slope of a given line falls within the range of $60° \leq |\theta| \leq 90°$, the given line is a vertical line; if $30° \leq |\theta| < 60°$, then a tilted line; and if $0° \leq |\theta| < 30°$, then a horizontal line. A tilted line 62 having an angle $\theta$ in FIG. 4 is classified as a horizontal line.

In order to eliminate the above drawback, assume that a threshold value $\theta_{th} = 10°$. Under this assumption, if a slope of a given line falls within the range of $80° \leq |\theta| \leq 90°$, the given line is defined as a vertical line; if $10° \leq |\theta| \leq 80°$, then a tilted line; and if $0° \leq |\theta| < 10°$, then a horizontal line. In this case, when an original is slightly rotated during image reading or is slightly tilted, as shown in FIG. 5, the following inconvenience occurs. Assume that $\theta_{61}' = 12°$ and $\theta_{62}' = -6°$. In this case, the following conditions are satisfied:

$|\theta_{61}'| \geq \theta_{th}(=10°)$ $|\theta_{62}'| < \theta_{th}(=10°)$

A tilted line 62' is undesirably deemed as a horizontal line, while a horizontal line 61' is undesirably deemed as a tilted line. Therefore, some frame lines are erroneously detected regardless of any threshold values $\theta_{th}$.

SUMMARY OF THE INVENTION

In consideration of the above situation, it is an object of the present invention to provide an image processing apparatus for classifying line segments in accordance with the lengths of line segments constituting a table frame.

In consideration of the above situation, it is another object of the present invention to provide an image processing apparatus capable of classifying line segments on the basis of angles between line segments constituting a table frame.

In consideration of the above situation, it is still another object of the present invention to provide an image processing apparatus capable of extracting a rectangular frame from a table frame image.

In consideration of the above situation, it is still another object of the present invention to provide an image processing apparatus capable of calculating numerical values on the basis of recognized table frame lines.

BRIEF DESCRIPTION OF THE DRAWINGS

FIG. 3 is a flow chart showing a main routine in the embodiment of the present invention;

FIG. 4 is a view showing a frame image;

FIG. 9 is a table showing characteristic points;

FIG. 10 is a table showing vectors;

FIG. 11 is a working table showing vectors;

FIG. 17 is a table showing classification for vectors gathering at one point;

FIG. 23 is a view for explaining the names of vector components;

FIG. 24 is a view showing a frame image defined by vector formation;

FIG. 25 shows a coordinate type vector table for storing vector coordinate data;

FIG. 26A shows a point type vector table for storing vector point data;

FIG. 26B shows a point data table for storing point coordinates;

FIG. 26C shows a vector list table for storing a list of vectors connected to a given point;

FIG. 27 is a flow chart showing an algorithm for generating a dot type vector table and a point data table by utilizing the coordinate type vector table;

FIGS. 32A and 32B are flow charts showing an algorithm for generating the rectangular frame vector table;

FIG. 43 is a view showing a table in which calculated values are written;

FIG. 45 is a view showing the cell table; and

FIG. 46 shows a character code table.

DETAILED DESCRIPTION OF THE REFERRED EMBODIMENTS

Preferred embodiments of the present invention will be described in detail with reference to the accompanying drawings. As a matter of course, image processing according to the present invention includes graphic processing.

Figure 2:
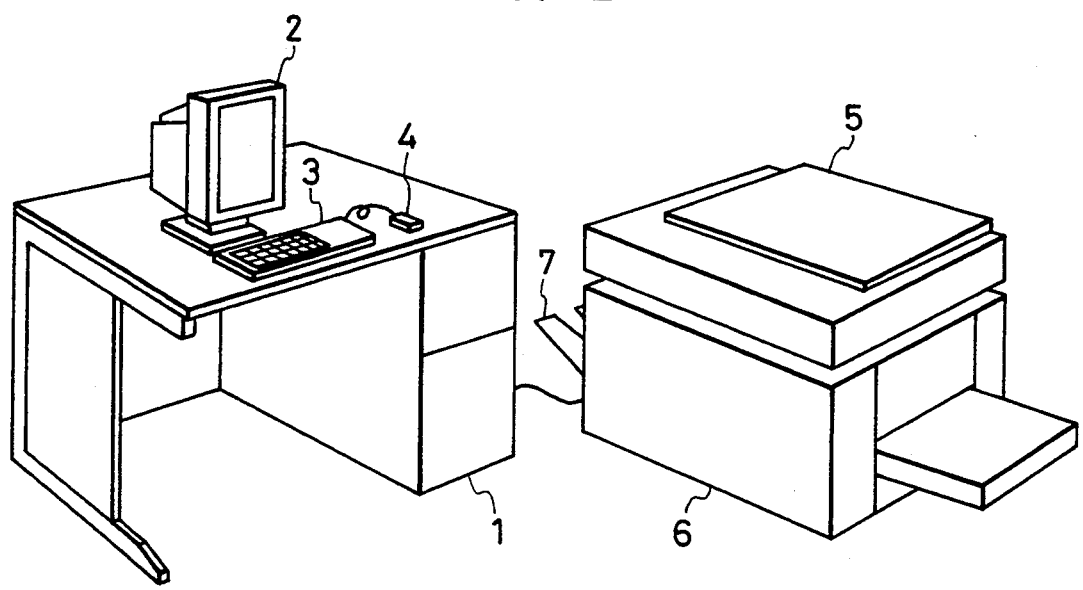
FIG. 2 is a perspective view of the frame making apparatus of FIG. 1 as a graphic system.

FIG. 2 is a perspective view of a graphic system constituting a frame making apparatus according to an embodiment of the present invention. The graphic system includes a controller 1, a CRT display 2, a keyboard 3, and a mouse 4, all of which constitute a so-called work station. The graphic system also includes an image scanner 5 for scanning a document and reading an image, and a printer 6 for printing out an image processed by the work station onto a paper sheet. An input to the frame making apparatus may be obtained by reading an original image written on an original by the image scanner 5 or by entering an original image on the CRT display 2 with the mouse 4. The original image is stored in an image memory 10 in any form.

Figure 1:
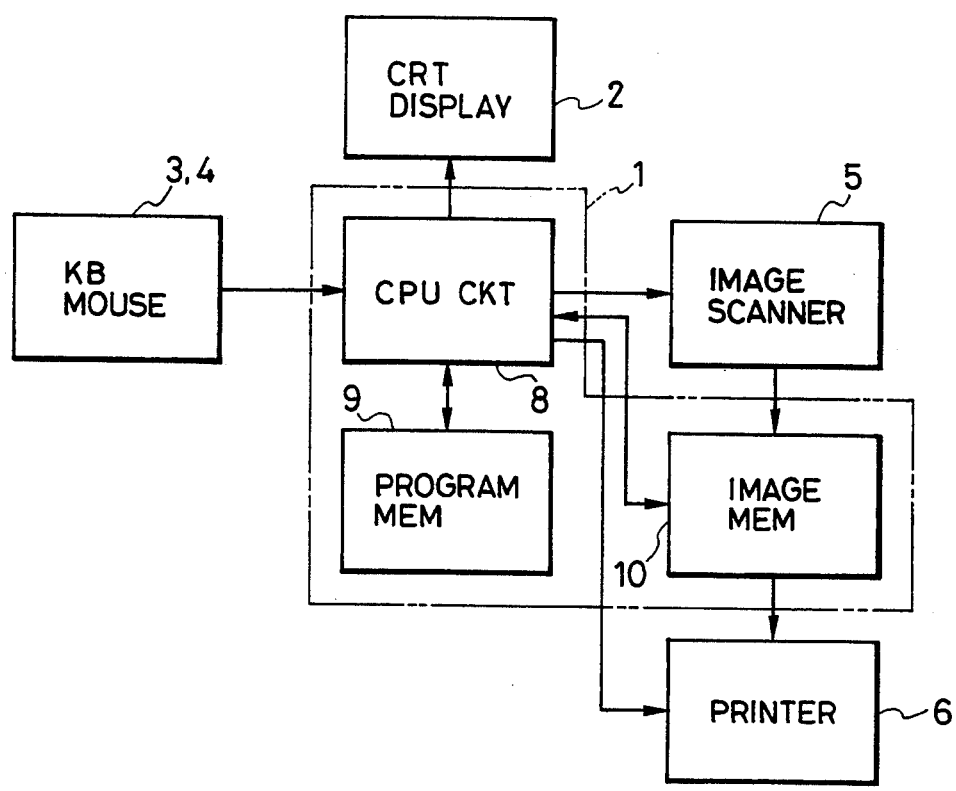
FIG. 1 is a block diagram of a frame making apparatus according to an embodiment of the present invention.

FIG. 1 is a block diagram of the frame making apparatus shown in FIG. 2. The controller 1 in the work station includes a CPU circuit 8 for controlling the overall operation of the apparatus, a program memory 9 comprising, e.g., a RAM for storing programs for making a frame, and an image memory 10 for storing digital images.

FIG. 3 is a flow chart showing an operation of the above-discussed frame making apparatus. The details of the operation of the frame making apparatus will be described with reference to the flow chart.

(Image Input)... Step S31

A user roughly sketches desired frame lines on a notebook or a paper sheet. FIG. 4 shows a frame written in this manner. An original is placed on the image scanner 5, and an image input command is supplied from the keyboard 3 or the mouse 4 to the controller 1. The CPU circuit 8 sends an image scanning command to the image scanner 5 in accordance with the program stored in the program memory 9. A CCD sensor or the like in the image sensor 5 reads image information from the original, and the read image information is stored in the image memory 10.

(Preparation)... Step S32

Figure 6:
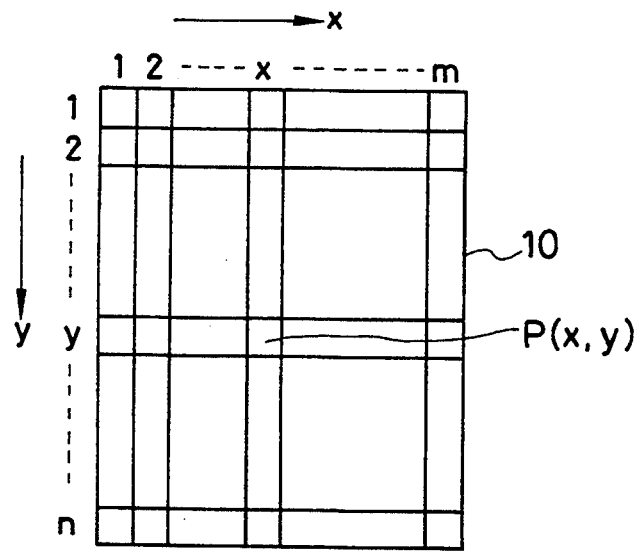
FIG. 6 is a memory map of an image memory.

A digital image input from the image scanner 5 has a matrix structure (FIG. 6) in the image memory 10. Each image is constituted by a maximum of m pixels in the horizontal direction (to be referred to as an x direction hereinafter) and a maximum of n pixels in the vertical direction (to be referred to as a y direction hereinafter) of the original. Pixels corresponding to white and black dots on the original are logic "0" and logic "1", respectively. More specifically, if coordinate values are given as $x=1, 2, \ldots m$ and $y=1, 2, \ldots n$ in the horizontal and vertical directions, a value for $P(x,y)$ of the pixel at point (x,y) is given as follows:

$$P(x, y) = \text{"0" (white)}$$
$$\text{"1" (black)}$$

A table frame can be expressed as a set of pixels for $P(x,y)=$"1". Noise reduction and thinning are performed as preparation operations for tracing an array of pixels of $P(x,y)=$"1". For example, noise reduction can be performed by conventional smoothing known to those skilled in the art. Thinning is performed by a conventional technique for degenerating black pixels in consideration of the number of black dots and the degree of connection thereof. When noise reduction and thinning are completed, the table frame can be represented as a set of continuous points having a width of 1.

Figure 7A:
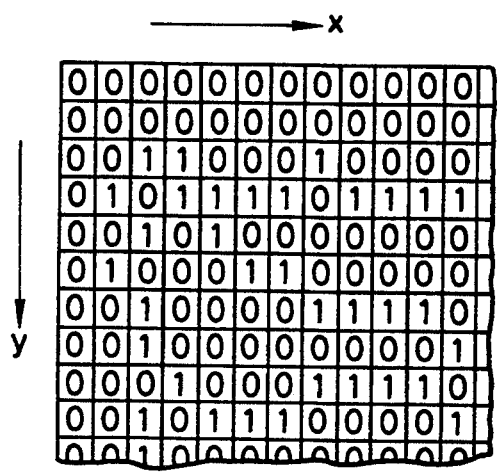
FIG. 7A is a view showing data in the image memory corresponding to some inputs in FIG. 5.

A line near a frame line portion 61 and a white portion 60 around the frame line portion 61 in the frame shown in FIG. 4 are shown in FIG. 7A. Logic "0" in FIG. 7A represents a white pixel, whereas logic "1" represents a black pixel.

(Vector Formation)... Step S33

Figure 8:
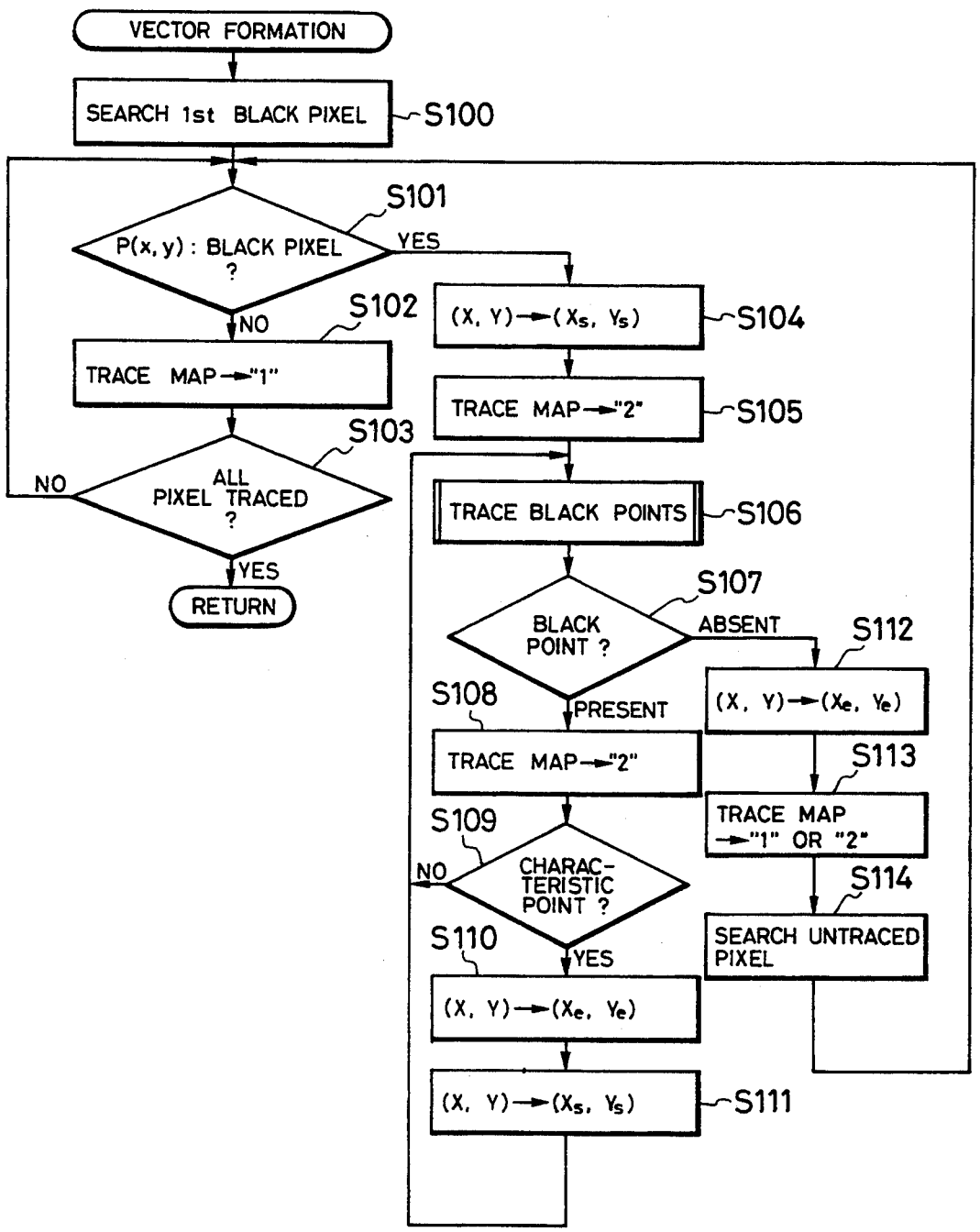
FIG. 8 is a flow chart showing control steps in vector formation.
Figure 12:
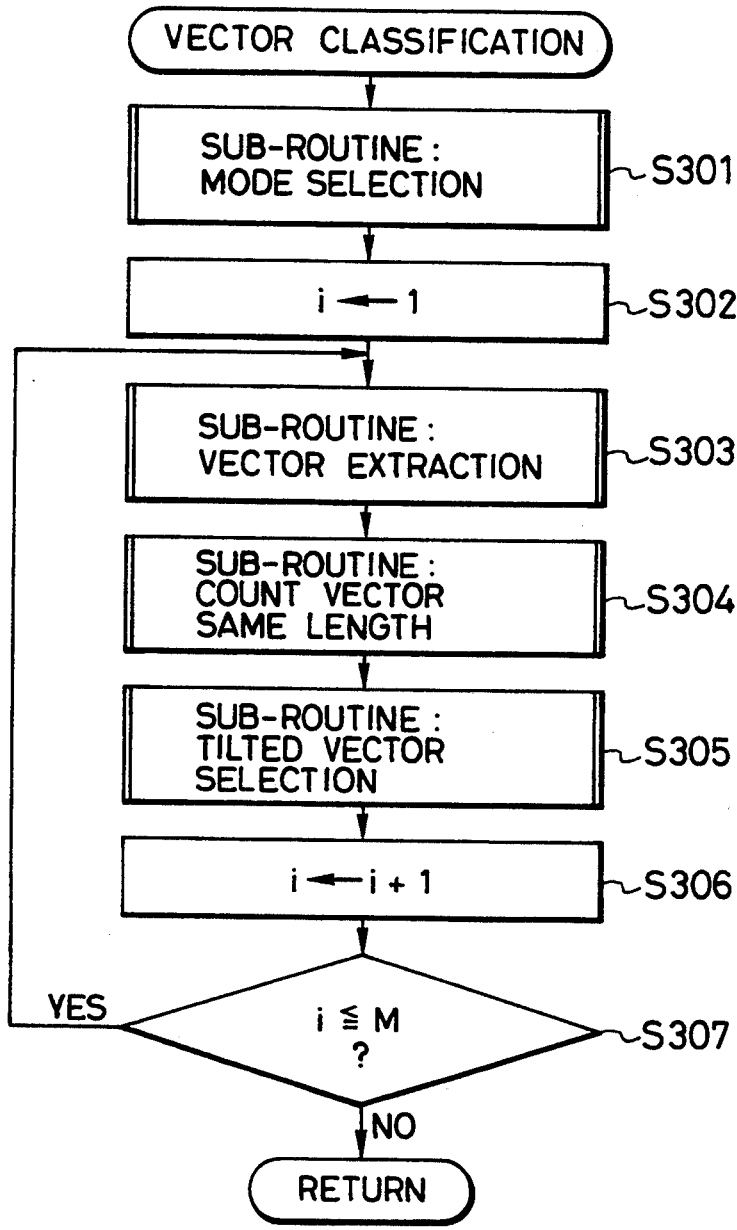
FIG. 12 is a flow chart showing a vector classification sub-routine according to a first embodiment of the present invention.

Frame lines are traced for pixels included in the resultant digital image and defined by points P(1,2), ..., P(x,y), ... P(m,n), and a tracing result is converted into vectors. An algorithm for line tracing/vector formation is shown in FIG. 8. Line tracing is performed by sequentially tracing black pixels and continues until a white pixel appears or the traced black pixel appears again. Vector formation is performed as follows. Black pixels are divided by characteristic points such as bent points, intersections, and branching points, coordinates of its initial and terminal points are used to define a length of a line segment, and the line segment is used to represent a set of black pixels between the initial and terminal points. The resultant characteristic points and vectors are written in the characteristic point table and the vector table shown in FIGS. 9 and 10, respectively.

Figure 7B:
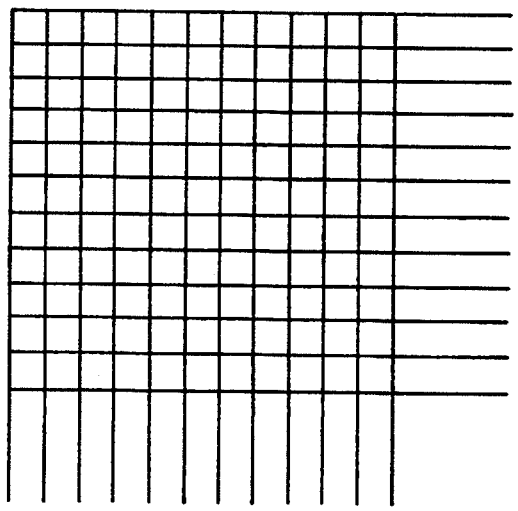
FIG. 7B is a view showing a trace map corresponding to each pixel in the image memory.

The above operation will be described in more detail with reference to the flow chart in FIG. 8. In step S100, the first black pixel is searched. The first black pixel can be searched in accordance with raster scanning from the upper left corner pixel P(1,1). If the first black pixel is found, the detected point is defined as initial point coordinates $(x_s,y_s)$ in step S104 and is stored in the vector table shown in FIG. 9. The trace map in FIG. 7B is marked as "traced" (e.g., "2") in step S105. Each trace map is prepared to correspond to each pixel in the image memory 10 in a one-to-one correspondence. As a result of tracing, if the traced pixel is a white pixel, "1" is marked. Otherwise, "2" is marked. The trace map can be arranged in part of the program memory 9 comprising, e.g., a RAM.

Black tracing in step S106 is to trace a point adjacent to the pixel P(x,y). The presence of a black point is checked in an order of eight adjacent points P(x+1,y−1), P(x+1,y), P(x+1,y+1), P(x,y+1), P(x−1,y+1), P(x−1,y), P(x−1,y−1), and P(x,y−1). If a black point is detected in any one of the eight adjacent points, the flow advances from step S107 to step S108. The point corresponding to this pixel is marked as a "traced" black point ("2") in the trace map. Black tracing continues until a vector for 10 pixels is cut out in the operations of the loop of steps S106 to S109.

When one vector is extracted, the flow advances to step S110, and coordinates of this black point are stored in the vector table as a terminal point $(x_e,y_e)$ corresponding to the vector representing the initial point obtained in step 104 (or step S111). The coordinates of this black point are stored as coordinates $(x_s,y_s)$ of the initial point of the next vector in step S111.

If no black points are detected or the traced black points (the pixel marked with "2" in the map in FIG. 7B in step S107), the line currently traced is deemed to be terminated by the current pixel, and the terminal point coordinates $(x_e,y_e)$ of the vector table are stored in step S112. If this point is detected as a white point, it is marked as white ("1") in step S113. However, if the point is a black point, "2" is marked. Therefore, tracing of one vector is completed.

In step S114, untraced pixels are searched. The flow then returns to step S101, and the searched point is determined to be a black or white point. If the point is determined to be a black point, the flow advances to step S104, and the operations in the above steps are repeated. However, if a white point is found in step S101, "1" is marked in the trace map in step S102. The CPU circuit determines in step S103 whether all pixels are traced. This can be determined whether a point of "0" is left in the trace map. Therefore, the vector table stores all vectors constituting the horizontal, vertical, and tilted lines in a tracing order.

Figure 5A:
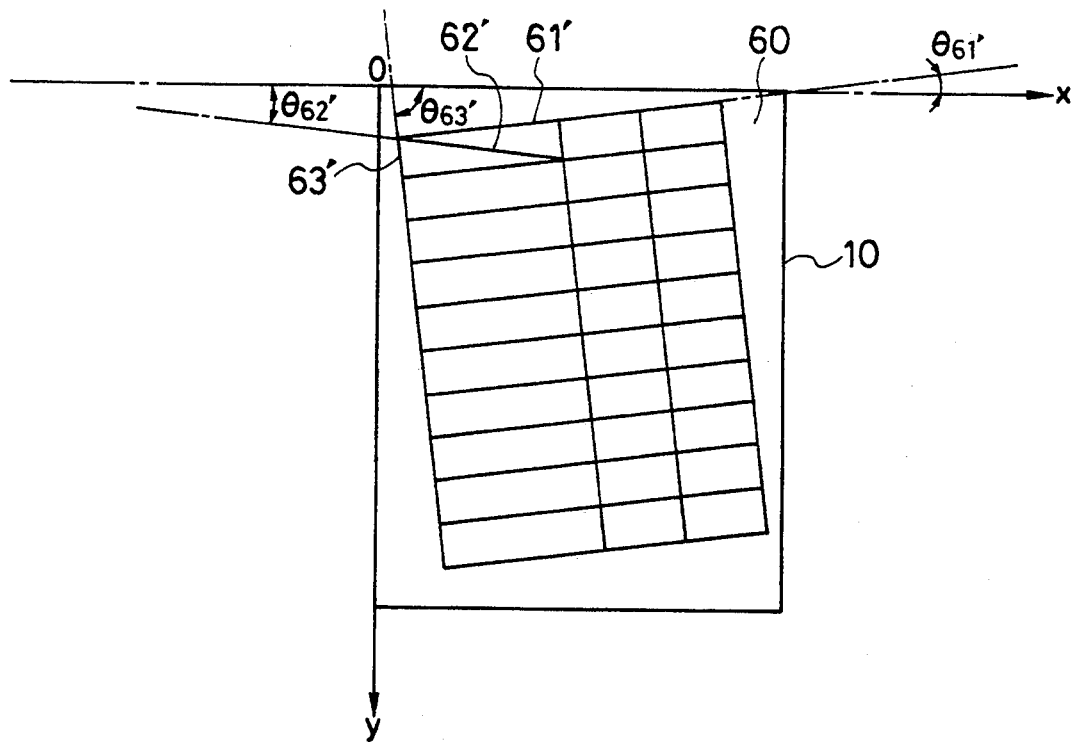
FIG. 5A is a view showing a rotated frame image.

The frame shown in FIGS. 4 and 5A is constituted by 33 (=3×11) horizontal vectors, 40 (=10×4) vertical vectors, and one tilted vector, i.e., a total of 74 (=33+40+1) vectors. A size N (suffix N in $V_N$ in FIG. 10) of the vector table is given as N=74. These 74 vectors are not classified into the horizontal, vertical, and tilted vectors and are stored in the vector table at random.

44 (=4×11) characteristic points are given, so that the size M of the characteristic point table is given as M=44.

As shown in FIG. 10, for example, a vector v1 is written in the table such that a characteristic point P1 is a terminal point.

(Vector Classification)... Step S34

First Embodiment

A tilted vector is extracted from data stored in the vector table shown in FIG. 10. A classification $k_j$ for a vector number $v_j$ is given as $k_j=1$ for the tilted vector.

A first embodiment of a vector classification algorithm will be described with reference to the flow charts in FIGS. 12 to 16. In the flow charts, control variables i, j, k, l, and m are used to repeat operations a predetermined number of times.

Figure 13:
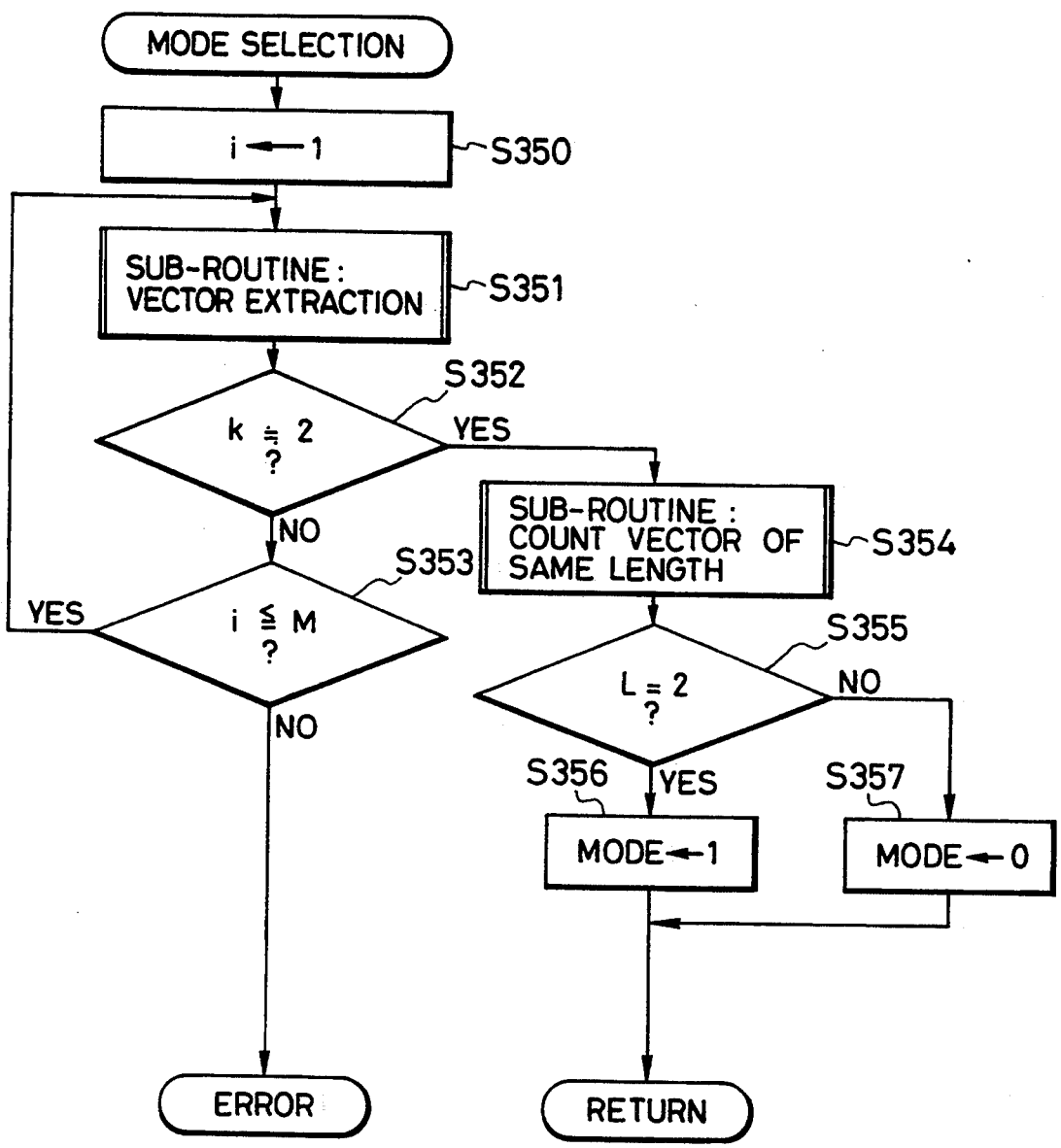
FIG. 13 is a flow chart showing a mode selection sub-routine.
Figure 14:
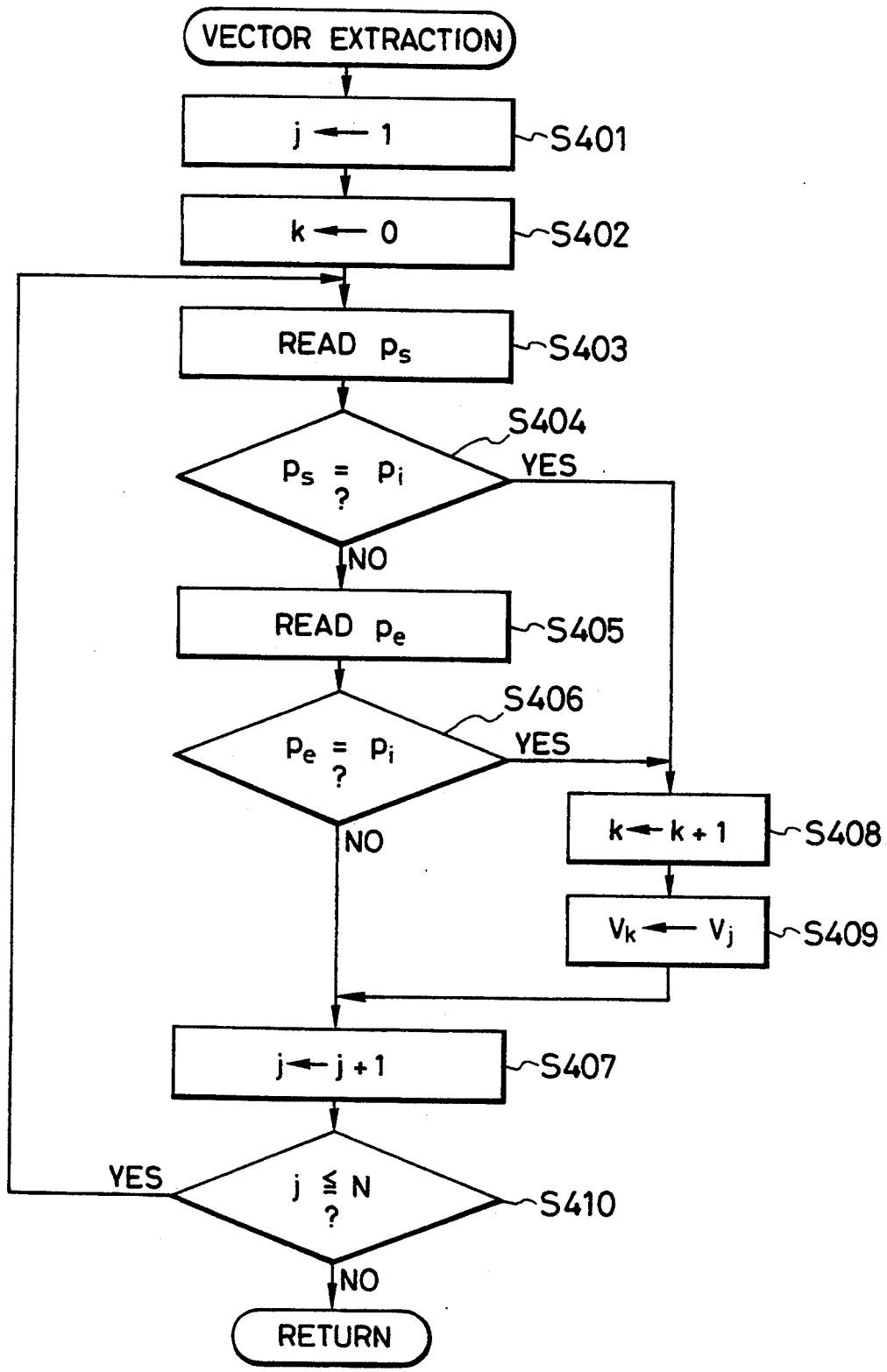
FIG. 14 is a flow chart showing a vector extraction sub-routine.

Mode selection is performed in step S301 in accordance with a detection as to whether a line distance in the horizontal direction is equal to that in the vertical direction. If so, mode=1 is set. Otherwise, mode=0 is set. FIG. 13 shows a flow chart of a mode selection sub-routine. Sub-routines in steps S351 and S354 will be described with reference to steps S303 and S304 (to be described later), and a description thereof is omitted. In the mode selection sub-routine in FIG. 13, a control variable i is set to be "1" in step S350. In steps S351 to S353, two line segments (k=2) contacting one characteristic point are searched.

When two line segments contacting one characteristic point (k=2) are found, the following decision step is executed. If the length of one of the two line segments contacting one characteristic point is equal to that of the other line segment (L=2), mode=1 is set in step S356. Otherwise (L≠2), mode=0 is set in step S357.

The control variable i is initialized to "1" in step S302, and M sub-routines corresponding to the number of characteristic points are looped.

The first sub-routine is a vector extraction sub-routine in step S303. In this sub-routine, vectors having point $P_i$ as an initial or terminal point are searched and are written in the working vector table shown in FIG. 11. The steps will be described with reference to a flow chart of a vector extraction sub-routine in FIG. 14.

In step S401, the control variable j associated with the vector $v_j$ is initialized to "1", and the variable k for counting the number of vectors having the point $P_i$ as its initial or terminal point is initialized to zero in step S402. In step S403, the value of the initial point $P_s$ of the vector $v_j$ is read out from the vector table. In step S404, the value of $P_s$ is compared with that of $P_i$. If $P_s$ is equal to $P_i$, the variable k is incremented by one in step S409. The vector number $v_j$ is set in the vector number $v_k$ in the working vector table. In step S407, the variable j is counted up, and the next vector is then checked.

However, if $P_s$ is not equal to $P_i$ in step S404, the terminal point $P_e$ of the vector $v_j$ is read out from the vector table in step S405. In step S406, $P_i$ is compared with $P_e$. If $P_i$ is equal to $P_e$, the flow advances to step S408. In step S409, the variable $k_i$ is incremented by one, and the vector number $v_j$ is set in the vector number $v_k$ in the working vector table. However, if $P_i$ is not equal to $P_e$, no operation is performed, and the variable j is counted up in step S407. The next vector is then checked.

When the operations in steps S403 to S410 are performed for all vectors $v_j$ (j=1, 2, ..., N), the sub-routine is ended in step S410. The value of the variable k at the end of this sub-routine is the number of vectors having the point $P_i$ as the initial or terminal point. If this sub-routine is executed for $P_i$ in FIG. 5B, then k=3 can be obtained.

A sub-routine for counting vectors of the same length in step S304 is executed. Of the vectors having the point $P_i$ as its initial or terminal point, vectors of the same length are counted.

Figure 15:
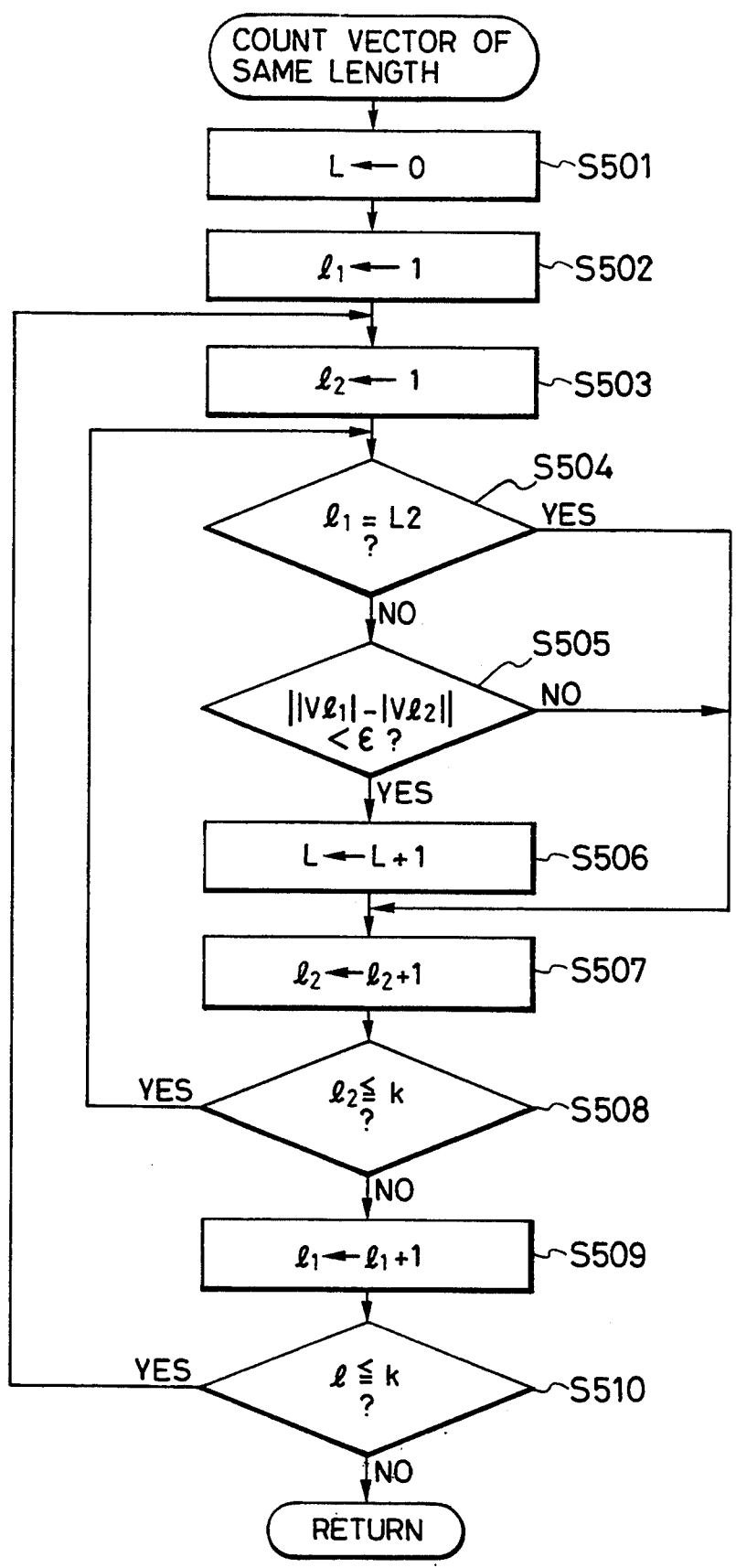
FIG. 15 is a flow chart showing a sub-routine of counting vectors of the same length.

The steps in counting the vectors of the same length will be described with reference to a flow chart in FIG. 15. In this case, k=3 is given.

The number L of vectors of the same length is initialized to zero in step S501. Control variables $l_1$ and $l_2$ are initialized to 1 in steps S502 and S503. In order to prevent comparison between the lengths of the vectors themselves, the variable $l_1$ is compared with the variable $l_2$ in step S504. If the variable $l_1$ is the same as the variable $l_2$, the flow jumps to step S507. Since $l_1=l_2=1$, then the flow advances to step S507. The variable $l_2$ is incremented by one in step S507, so that $l_2=2$ is obtained. In step S508, $l_2 \leq k$ is checked. In this case, since k=3, i.e., $l_2<k$, then the flow returns to step S504. At this time, the condition $l_1 \neq l_2$ is given and the magnitudes of the vectors are compared in step S505. If the absolute value $||vl_1|-|vl_2||$ of the difference $||vl_1|-|vl_2||$ of the magnitudes of the vectors is smaller than a predetermined threshold value $\epsilon$, the number L of vectors of the same length is incremented by one.

The threshold value e is given as a proper positive value in accordance with the number of pixels. The length $|vl_1|$ of the vector is obtained such that the initial point $P_s$ and the terminal point $P_e$ are obtained from the vector table, and a distance using the coordinate values of the characteristic points is calculated. For example, if $P=(x_1,y_1)$ and $P_e=(x_2,y_2)$, then $$|vl_1| = \sqrt{(x_1-x_2)^2 + (y_1-y_2)^2}$$

If the above condition is not satisfied, the lengths of vectors $vl_1$ and $vl_2$ are deemed not to be the same. The flow advances to step S507 to perform the next vector comparison. By repeating the above operation k times, the reference vector $vl_1$ is changed in step S509. In this condition, the comparison operations are repeated k times, and the sub-routine is ended in step S510.

When this sub-routine is ended, a value corresponding to the number of vectors of the same length is set in the variable L. The correspondence between the vectors with respect to the mode, L, and k is shown in FIG. 17.

Figure 16:
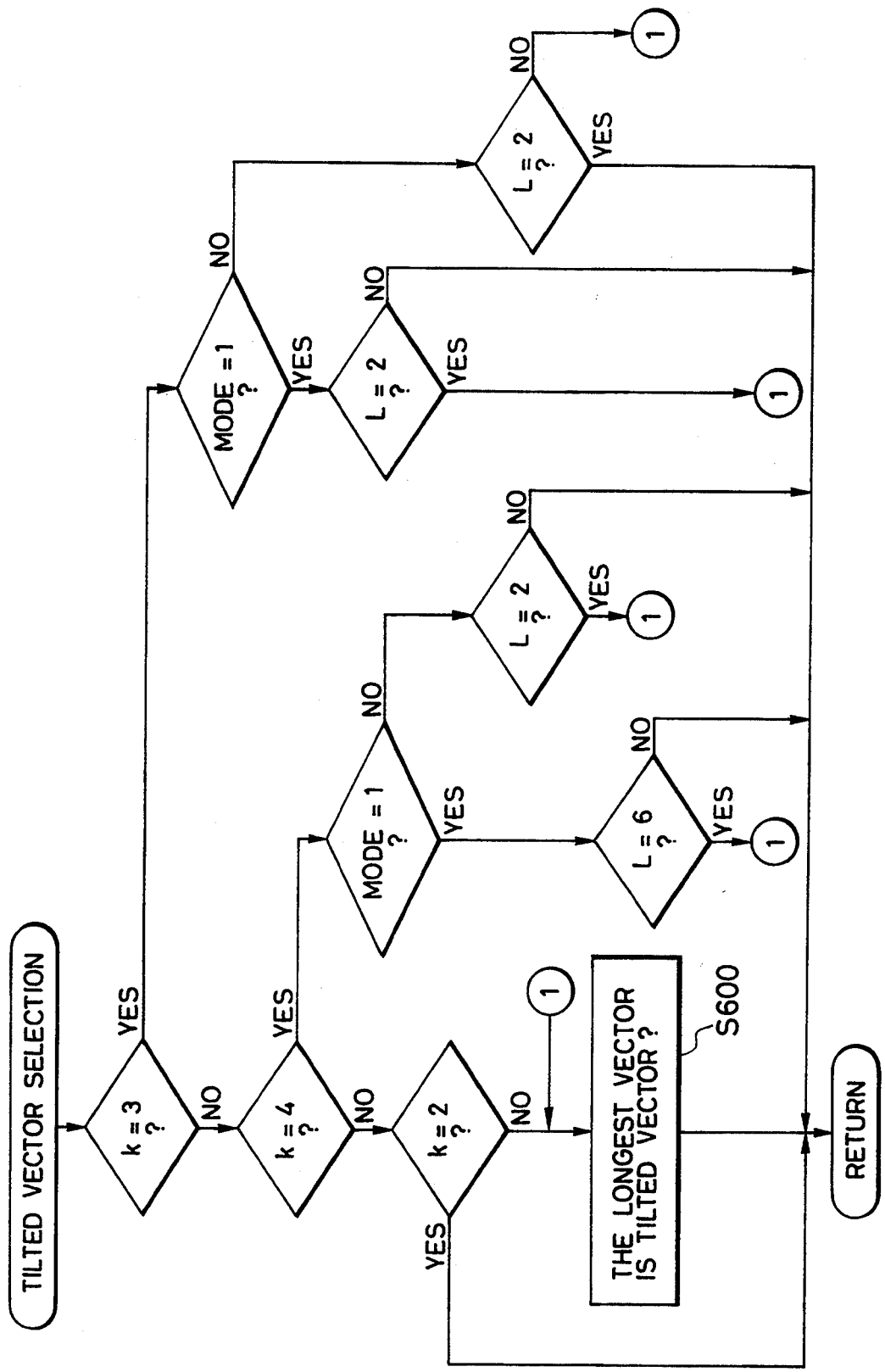
FIG. 16 is a flow chart showing a sub-routine of tilted vector selection.

A tilted vector selection sub-routine in step S305 is executed next. In this sub-routine, vectors are classified into tilted/nontilted vectors in accordance with the mode and values of k and L. If a line segment has a tilted vector, a vector having a maximum length is determined to be tilted. A flow chart for this algorithm is shown in FIG. 16. The flow chart in FIG. 16 corresponds to that of FIG. 17. In step S600, a vector having a maximum length is selected as a tilted vector, and "1" is written for the deemed tilted vector in the classification k column of the vector table. The sub-routine in FIG. 16 is ended, and a description of the decision blocks in FIG. 16 will be omitted.

In the above embodiment, the length $|vl_1|$ of the vector is calculated using the coordinate values of the initial and terminal points of the vector. However, in vector formation in step S33, the number of pixels included in the vector may be counted to use a total number of pixels as a distance.

According to the first embodiment described above, the tilted line segment within the frame can be discriminated by classifying the lengths of the vectors.

The frame lines which are equidistantly drawn are exemplified for the same of simplicity. However, if the frame lines are not equidistantly drawn, an algorithm can be easily programmed although its flow chart is complicated.

A second embodiment of vector classification will be described below.

(Vector Classification)... Step S34

Second Embodiment

Vector data stored in the vector table shown in FIG. 10 are classified into horizontal, vertical, and tilted vectors. More specifically, $k_j=1$ is set in the classification $k_j$ of the vector $v_j$ for the horizontal vector; $k_j=2$, for the vertical vector; and $k_j=3$, for the tilted vector.

Figure 18:
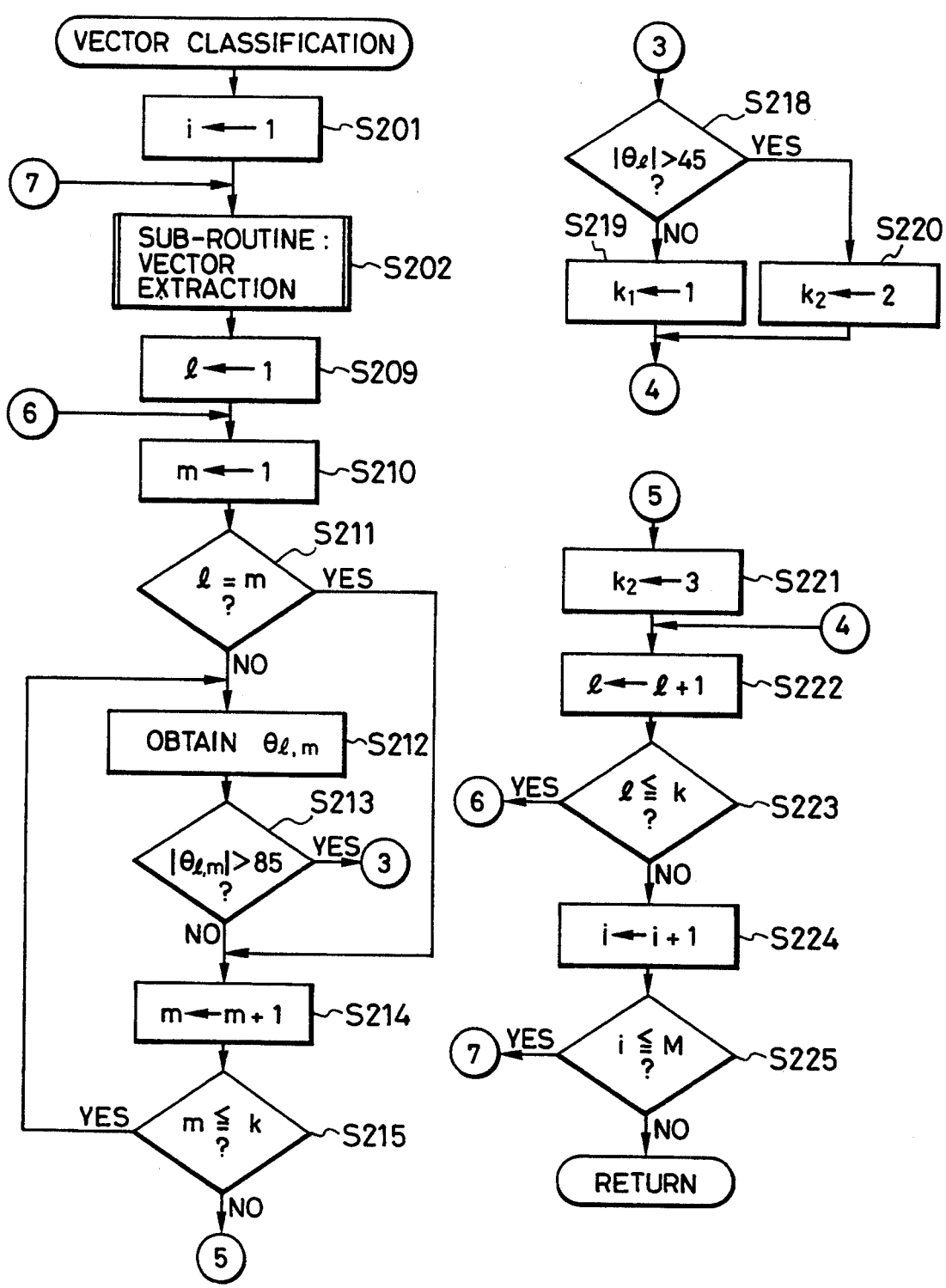
FIG. 18 is a flow chart showing a vector classification sub-routine according to a second embodiment of the present invention.

The vector classification algorithm according to this embodiment will be described with reference to FIG. 18. Control variables i, j, k, l, and m are used to repeat operations a predetermined number of times, as previously described. Of the vectors each having one point as an initial or terminal point, the vectors are classified by an angle formed between any two of them according to a basic algorithm of the second embodiment.

In step S201, the control variable i is initialized to 1. In step S202, vectors each having the point $P_1$ as the initial or terminal point are stored in the working vector table in the vector extraction sub-routine shown in FIG. 14.

An angle $\theta_{l,m}$ formed between vectors $V_l$ and $V_m$ of the working vectors $V_1, V_2, \ldots V_k$ is calculated to classify vectors into horizontal, vertical, and tilted vectors. $V_1=v_1$, $V_2=v_2$, and $V_3=v_3$ are established in FIG. 5B. In step S209, the control variable l is initialized to 1, and the control variable m is initialized to 1. In step S211, an angle $\theta_{l,m}$ formed between the vectors $V_l$ and $V_m$ is calculated. When an angle $\theta_{1,2}$ is to be calculated, the vector $V_1$ is the vector $v_1$ having $P_1$ as an initial point and $P_2$ as a terminal point. Similarly, the vector $V_2$ is the vector $v_2$ having $P_1$ as an initial point and $P_3$ as a terminal point. The coordinates of these points can be derived from the characteristic point table. The angle $\theta_{1,2}$ formed between the vectors $V_1$ and $V_2$ is given from the inner product formula as follows:

$$\cos\theta_{1,2} = (P_1P_2, P_1P_3)/|P_1P_2||P_1P_3|$$

$$= \{(x_2 - x_1)(x_3 - x_1) + (y_2 - y_1)(y_3 - y_1)\}/\{\sqrt{(x_2 - x_1)^2 + (y_2 - y_1)^2}\sqrt{(x_3 - x_1)^2 + (y_3 - y_1)^2}\}$$

Figure 5B:
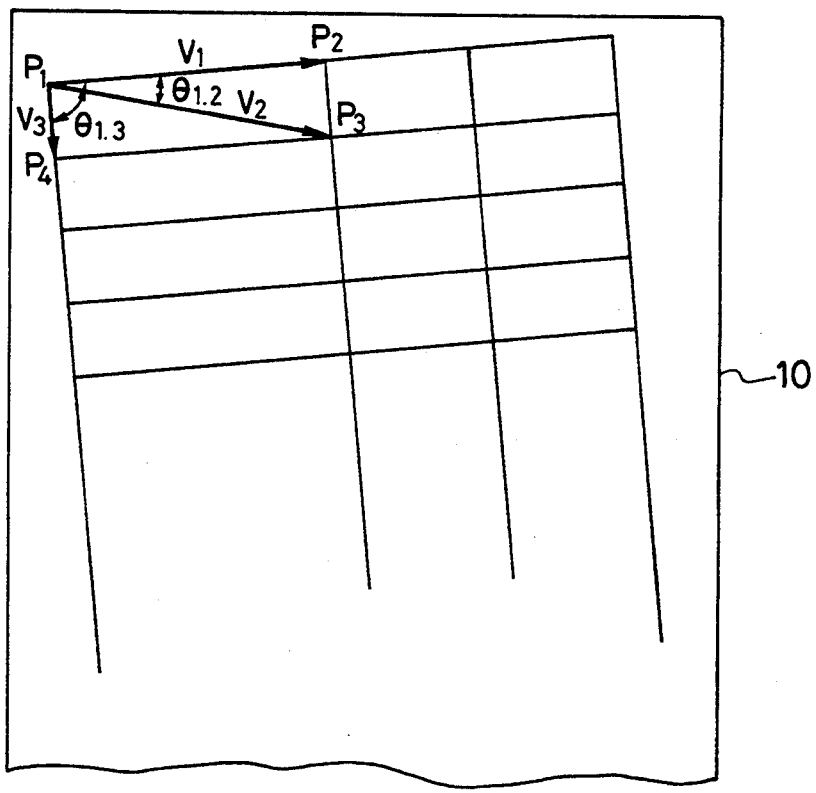
FIG. 5B is an enlarged view of the rotated frame image shown in FIG. 5A.

The angle $\theta_{1,2}$ in FIG. 5B is given as $\theta_{1,2}=15°$. Since condition $|\theta_{1,2}|<85°$ is given, the CPU circuit determines in step S213 that the vector $V_1$ is not perpendicular to the vector $V_2$. The control variable m is incremented by one in step S214.

An angle $\theta_{1,3}$ formed between the vectors $V_1$ and $V_3$ is calculated. Since condition $|\theta_{1,3}>85°$ is established, the flow advances to step S218. An absolute value $|\theta_1|$ of the angle $\theta_1$ of the vector $v_1$ satisfies condition $|\theta_1|<45°$, the vector $v_1$ is determined to be a horizontal vector in step S219, and 1 is set in the classification $k_1$ in the vector table. Since classification of the vector $V_1$, i.e., the vector $v_1$ corresponding to the vector $V_1$ is completed, the same operation is performed for the next vector $V_2$. Since angles $\theta_{2,1}$ and $\theta_{2,3}$ satisfy conditions $|\theta_{2,1}|<85°$ and $|\theta_{2,3}<85°$, respectively, NO is obtained for all other vectors in step S213. In this case, the flow advances to step S221. The vector $V_2$, i.e., the vector $v_2$ corresponding to the vector $V_2$ is determined to be a tilted vector. Therefore, 3 is set in the classification $k_2$ in the vector table in step S221.

Since the vector $V_3$ satisfies conditions $|\theta_{1,3}|>45°$ and $|\theta_3>85°$, the vector $v_3$ corresponding to the vector $V_3$ is determined to be a vertical vector. In this case, 2 is set in the classification $k_2$ in the vector table.

The above operations are performed for all points $P_1$, $P_2$, ... $P_M$ and the classification of all vectors is completed.

According to the second embodiment described above, an angle between each two adjacent vectors of the vectors providing the common initial point is calculated. Two vectors which form an angle closest to 90° are determined to be the horizontal and vertical lines. Therefore, vectors can be accurately classified into vectors corresponding to the horizontal, vertical, and tilted lines.

(Printer Output)... Step S35

A frame is constituted by straight lines corresponding to the vectors in accordance with the vector classification result and is then output to the printer 6.

Vector classification in step S34 in this embodiment may be performed in either the first or second embodiment. However, if the first and second embodiments are combined to perform vector classification, a variety of frames having different line spacings can be obtained. In this embodiment, a black frame is formed on a white background. However, a white frame may be formed on a black background, or a color frame excluding the black and white frames may be formed.

According to the present invention, the characteristics of the frame lines of the original image are extracted on the basis of the angle formed between the vectors representing the line segments, and a frame consisting of the straight lines can be made.

Third Embodiment

A frame making apparatus and a table numeral operation apparatus will be described in detail with reference to the accompanying drawings.

Although a description of the third embodiment may overlap that of the first and second embodiments, the following operations will be described below:

(1) frame lines constituting a table are recognized as a set of rectangular frames from a handwritten input image, and a resultant frame is made of straight lines;

(2) in addition, an image in the rectangular frame is cut out; and (3) in addition, columns and rows in the rectangular frame are recognized to perform numeral operations within the frame.

As previously described, FIG. 2 is a perspective view of a graphic system constituting a frame making apparatus according to an embodiment of the present invention. The graphic system includes a controller 1, a CRT display 2, a keyboard 3, and a mouse 4, all of which constitute a so-called work station. The graphic system also includes an image scanner 5 for scanning a document and reading an image, and a printer 6 for printing out an image processed by the work station onto a paper sheet. An input to the frame making apparatus may be obtained by reading an original image written on an original by the image scanner 5 or entering an original image on the CRT display 2 with the mouse 4. The original image is stored in an image memory 10 in any form.

As previously described, FIG. 1 is a block diagram of the frame making apparatus shown in FIG. 2. The controller 1 in the work station includes a CPU circuit 8 for controlling the overall operation of the apparatus, a program memory 9 comprising, e.g., a R3LM for storing programs for making a frame, and an image memory 10 for storing digital images.

Figure 19:
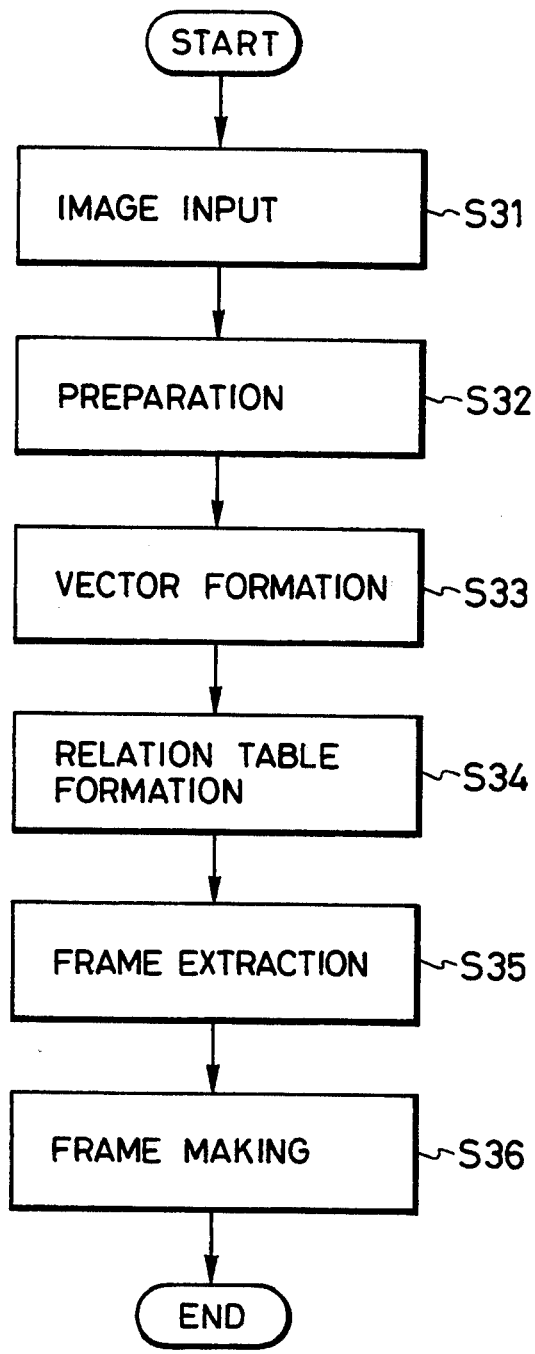
FIG. 19 is a flow chart showing processing of frame making.

FIG. 19 is a flow chart showing an operation of the above frame making apparatus according to the third embodiment. The details of the operation of the frame making apparatus will be described with reference to the flow chart.

(Image Input)... Step S31

Figure 20:
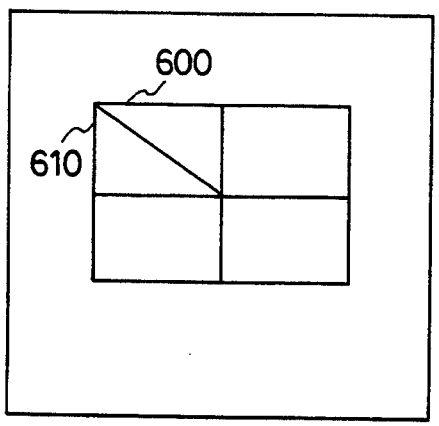
FIG. 20 is a view showing a frame image.

A user roughly sketches desired frame lines on a notebook or a paper sheet. FIG. 20 shows a frame handwritten in this manner. An original is placed on the image scanner 5, and an image input command is supplied from the keyboard 3 or the mouse 4 to the controller 1. The CPU circuit 8 sends an image scanning command to the image scanner 5 in accordance with the program stored in the program memory 9. A CCD sensor or the like in the image sensor 5 reads image information from the original, and the read image is stored in the image memory 10.

(Preparation)... Step S32

Figure 21:
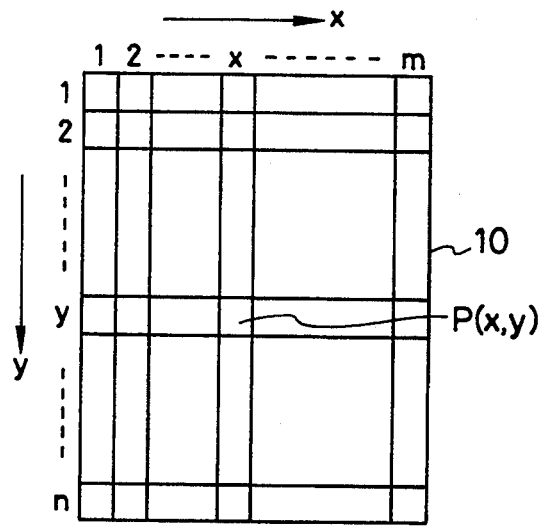
FIG. 21 is a view showing a space in an image memory.

A digital image input from the image scanner 5 has a matrix structure (FIG. 21) in the image memory 10. Each image is constituted by a maximum of m pixels in the horizontal direction (to be referred to as an x direction hereinafter) and a maximum of n pixels in the vertical direction (to be referred to as a y direction hereinafter) of the original. Pixels corresponding to white and black dots on the original are logic "0" and logic "1", respectively. More specifically, if coordinate values are given as x=1, 2, ... m and y=1, 2, ... n in the horizontal and vertical directions, a value for P(x,y) of the pixel at point (x,y) is given as follows:

$$P(x, y) = \begin{cases} \text{"0" (white)} \\ \text{"1" (black)} \end{cases}$$

A handwritten table frame can be expressed as a set of pixels for P(x,y)="1". Noise reduction and thinning are performed as preparation operations for tracing an array of pixels of P(x,y)="1". For example, noise reduction can be performed by conventional smoothing known to those skilled in the art. Thinning is performed by a conventional technique for eliminating black pixels in consideration of the number of black dots and the degree of connection thereof. When noise reduction and thinning are completed, the table frame can be represented as a set of continuous points having a width of 1.

Figure 22:
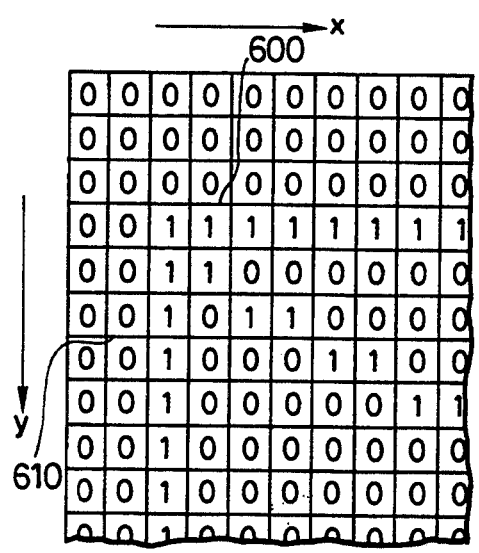
FIG. 22 is a view showing image data stored in the image memory.

A line near a frame line portion 610 and a white portion 600 around the frame line portion 610 in the handwritten frame shown in FIG. 20 are shown in FIG. 22. Logic "0" in FIG. 22 represents a white pixel, whereas logic "1" represents a black pixel.

(Vector Formation)... Step S33

Black pixels are traced for pixels included in the resultant digital image and defined by points P(1,2), ..., P(x,y), ... P(m,n), and a tracing result is converted into vectors. The resultant coordinates are written in a coordinate type vector data table 91 shown in FIG. 25. The x- and y-coordinates of the initial point are stored in x- and y-coordinate columns 93 and 94 of the initial point, respectively. The x- and y-coordinates of the terminal point are stored in x-and y-coordinate columns 95 and 96 of the terminal point, respectively. A technique for converting a raster image into vector data having as the initial and terminal points the characteristic points such as end points, bent points, intersections, and branching points is known to those skilled in the art, and a description thereof will be omitted.

Each vector data V consists of initial point coordinates $P_s(x_s, y_s)$ and terminal point coordinates $P_e(x_e, y_e)$. A suffix s represents the first character of "start", and a suffix e represents the first character of "end".

The vectors stored in the coordinate type vector table 91 have numbers 92 respectively assigned as $V_1$, $V_2$, ... $V_m$. Therefore, the number of vector numbers $V_1$ to $V_m$ is a total number of vectors.

An angle θ97 in the coordinate type vector table 91 is an angle representing a slope of each vector and can be calculated by coordinate values of the initial and terminal points as follows:

$$\theta = \tan^{-1}(y_e - y_s)/(x_e - x_s) \quad \text{(for } x_e \neq x_s\text{)}$$
$$\pi/2 \quad \text{(for } x_e = x_s \text{ and } y_e > y_s\text{)}$$
$$-\pi/2 \quad \text{(for } x_e = x_s \text{ and } y_e < y_s\text{)}$$
$$\text{error} \quad \text{(for } x_e = x_s \text{ and } y_e = y_s\text{)}$$

The slopes θ97 of the vectors are then written in the coordinate vector table 91. The angle θ in FIG. 25 is expressed in units of degrees.

When an original image shown in FIG. 20 is input, it is converted into vectors, as shown in FIG. 24. The coordinate values are properly determined. The numerical values in the coordinate type vector table are obtained for the case in FIG. 24. In this case, the total number m of vectors is 13, i.e., $V_1$ to $V_{13}$.

In the subsequent operations, a point having a smaller y-coordinate is defined as an initial point for a vertical vector. Points having smaller x-coordinates are defined as initial values for vectors excluding the vertical vectors. In this manner, the vectors are written in the coordinate type vector table 91. The vertical vectors are determined by an algorithm shown in FIG. 36.

(Relation Table Formation)... Step 34

Relation table formation includes operations for forming three data tables representing the relationship between the vectors, points, and coordinates, on the basis of frame image coordinate vector data 91 obtained in step S33. The three data tables are a point type vector table 101 shown in FIG. 26A, a point data table 105 shown in FIG. 26B, and a vector list table 110 shown in FIG. 26C.

The point type vector table 101 is different from the coordinate type vector table 91. A vector is represented by point numbers 103 and 104 of the initial and terminal points in the point type vector table 101. The point data table 105 represents x- and y-coordinates 107 and 108 of each point given by the corresponding point number. The vector list table 110 stores all vectors connected to each point so as to list the stored data.

Nine point data $P_1$ to $P_9$ are given and 26 vectors $L_1$ to $L_{26}$ are listed for the case (FIG. 24) in FIGS. 26A to 26C.

An algorithm for obtaining the point type vector table 101 and the point data table 105 from the coordinate type vector table 91 will be described with reference to a flow chart in FIG. 27. In step S110, the control variable i for a counter and a total number n of points are initialized to zero. In step S111, coordinates of the initial and terminal points of the vector represented by the vector number $V_1$ in the coordinate type vector table 91 are obtained. The CPU circuit determines in step S112 whether the initial point is stored in the point data table 105. Since the initial point $(x_s, y_s)$ of the vector represented by the vector number $V_1$ is not yet stored in the point data table 105, the flow advances to step S113. This point is stored as a point represented by the point number $P_1$, and therefore the total number n is incremented by one. In step S115, the point given by the point number $P_1$ is added in the initial point column 103 from the point type vector table 101.

The same operations as described above are performed in steps S116 to S119. The terminal point $(x_e, y_e)$ is stored as a point represented by the point number $P_2$, and thus the total number n is incremented by one. In step S120, the control variable i is incremented by one. The CPU circuit determines in step S121 whether condition i>m is established, i.e., whether all vectors are checked. If NO in step S121, the flow returns to step S111, and the operations in steps S111 to S121 are repeated. The above operations are performed for all the vectors $V_i$(i=1 to 13).

When the point has already been stored in the point data table 105 as in the initial point of the vector $V_3$, the point number $P_1$ is read out in step S114 or S118 and is written in the initial point column 103 or the terminal point column 104 in the point type vector table 101. The numerical values written in the point type vector and point data tables 101 and 105 shown in FIGS. 26A and 26B exemplify the frame shown in FIG. 24.

Figure 28:
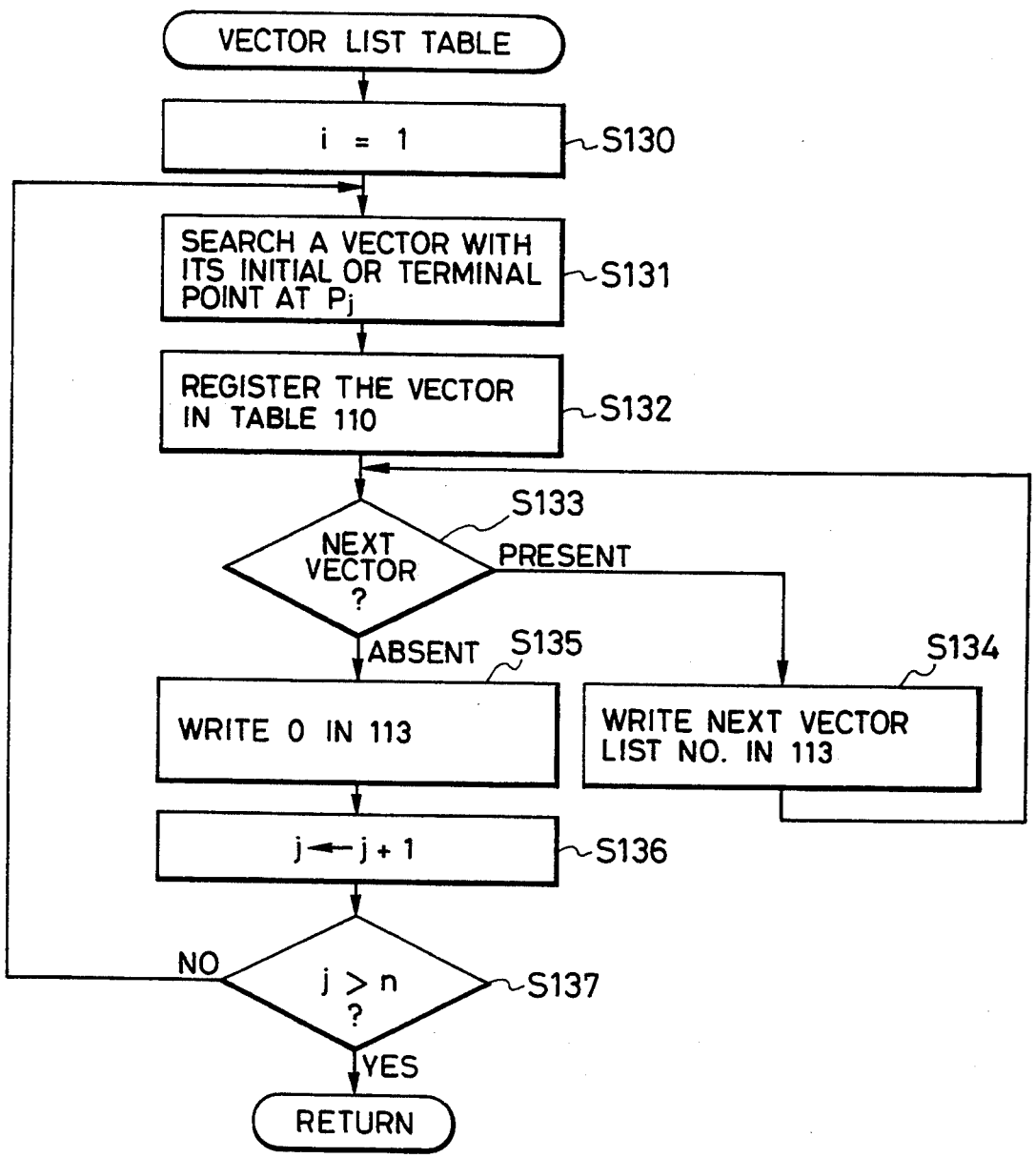
FIG. 28 is a flow chart showing an algorithm for generating a vector list table.

An algorithm for obtaining the vector list table 110 from the point type vector table 101 and the point data table 105 will be described with reference to a flow chart in FIG. 28.

The following operations are performed for all point data $P_j$ (j=1 to n) (n=9 in this case). In step S130, counter j is initialized to 1. In step S131, a vector having the point $P_j$ as the initial or terminal point is derived from the point type vector table 101. If any vector which satisfies the above condition is found, its vector list number $L_i$ is stored in a vector list number column 111 in the vector list table 110, and its vector number is stored in a vector number column 112 in step S132. The CPU circuit determines in step S133 whether the next connecting vector is present. If YES, the next vector list number is written in the NEXT column 113 in the vector list table 110 in step S134. If no connecting vector is present, $\phi$ is written in step S135.

The control variable j is incremented by one in step S136. The CPU circuit determines in step S137 whether condition j>n is established, i.e., whether processing of all the points is completed. If NO in step S137, the flow returns to step S131. The operations in steps S131 to S137 are repeated. For example, vectors connected to the point $P_1$ in FIG. 8 are $V_1$, $V_3$, and $V_4$.

(Frame Extraction)... Step S35

An algorithm for extracting frame data from the coordinate type vector table 91 (FIG. 25), the point type vector table 101 (FIG. 26A), the point data table 105 (FIG. 26B), and the vector list table 110 (FIG. 26C) will be described.

A frame is single rectangular frame data or a set of a plurality of rectangular frame data. A set of vectors constituting each rectangular component is obtained in the form of a rectangular frame vector table 130 in FIG. 29. The rectangular frame vector table 130 consists of upper vectors 132, left vectors 133, right vectors 134, and lower vectors 135 for vectors represented by frame numbers $W_1$ to $W_4$. A vector 136 tilted downward to the right and a vector 137 tilted upward to the right are used for a frame including tilted lines.

An algorithm for obtaining the rectangular frame vector table 130 will be described with reference to flow charts in FIGS. 32A and 32B.

Figure 35:
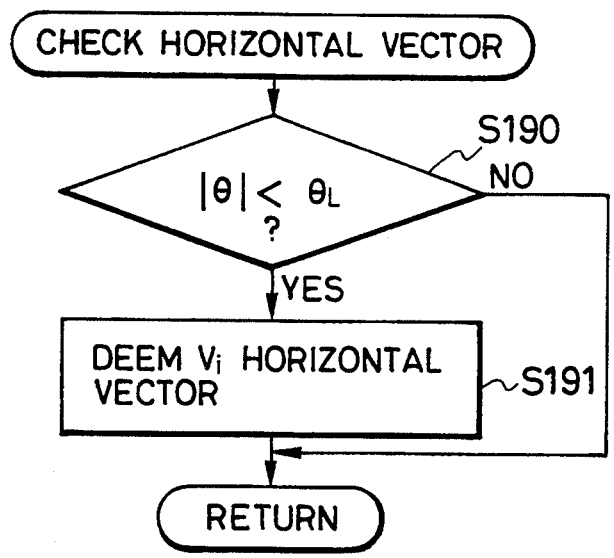
FIG. 35 is a flow chart showing an algorithm for determining a horizontal vector.

In step S160, counter i is initialized to 1. The CPU circuit determines in step S161 whether vectors $V_i$ (i=1 to m) from the coordinate type vector table 91 are horizontal vectors. An algorithm for determining the horizontal vectors is shown in the flow chart of FIG. 35. The CPU circuit determines in step S190 whether the absolute value $|\theta_i|$ of an angle $\theta_i$ is smaller than a predetermined threshold value $\theta_L$. If YES in step S190, the CPU circuit determines in step S191 that the vector $V_i$ is a horizontal vector. Note that the threshold value $\theta_L$ is determined to fall within the range of about 5° to 10°.

Figure 33:
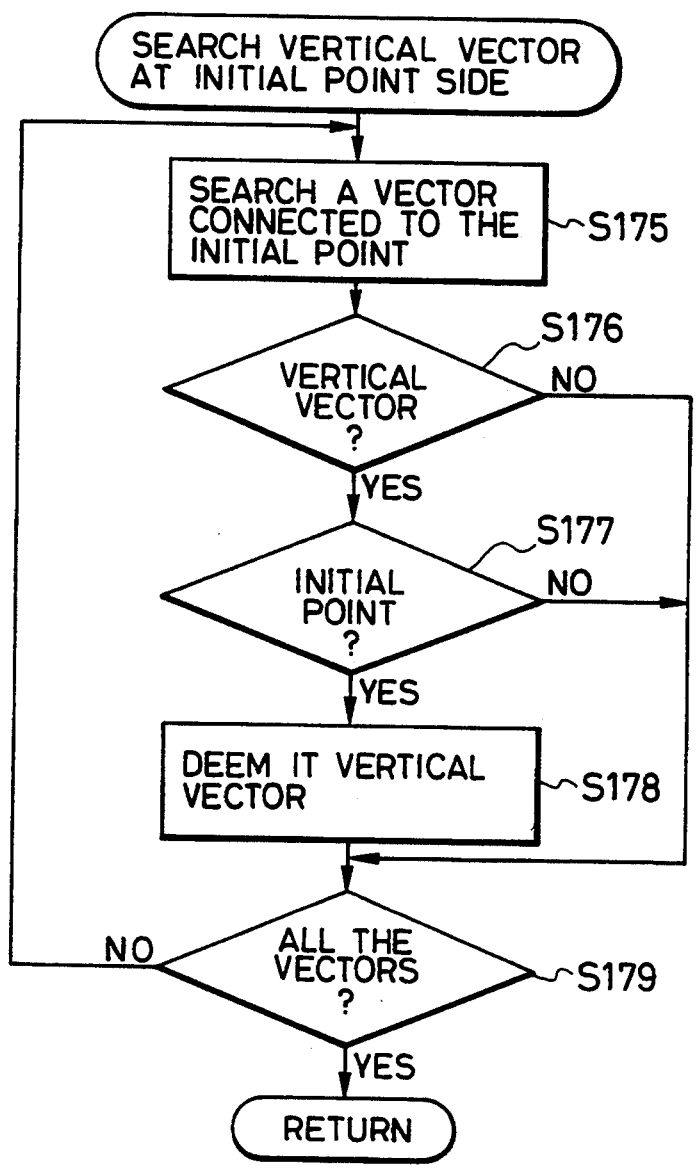
FIG. 33 is a flow chart showing a sub-routine for tracing a vertical vector at the initial point side.

If the vector $V_i$ is determined to be a horizontal vector, the vector number $V_i$ is written in the upper vector column 132 in step S161a. In step S162, the initial point of the vector number $V_i$ is given as an initial point, and the CPU circuit determines whether vertical vectors connected to this initial point are present. FIG. 33 is a flow chart showing an algorithm for retrieving vertical vectors on the initial point side. In step S175, vectors connected to the initial point are obtained from the vector list table 110. The CPU circuit determines in step S176 whether the readout vectors are vertical vectors. The CPU circuit determines in step S177 whether the vector is a vertical vector having the point of interest as the initial point. If YES in step S177, this vector is determined as a vertical vector of interest in step S178. The CPU circuit determines in step S179 whether all vectors commonly connected to the point of interest are checked. If NO in step S179, the flow returns to step S175, and the operations in steps S175 to S179 are repeated.

Figure 36:
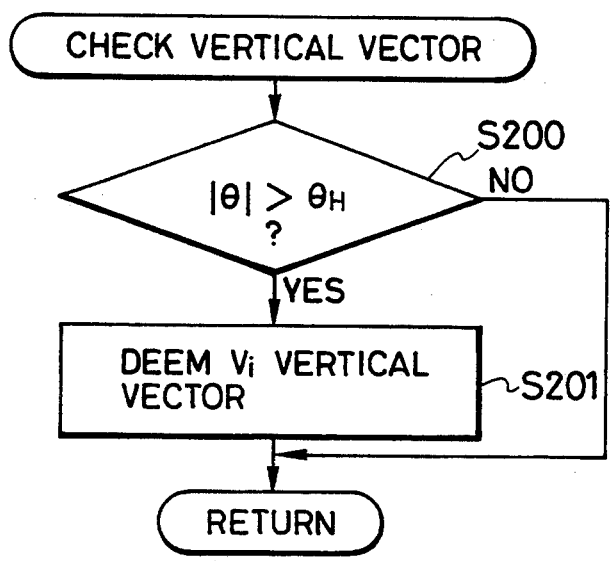
FIG. 36 is a flow chart showing an algorithm for discriminating a vertical vector.

The vertical vector determination will be described with reference to a flow chart of FIG. 36. The CPU circuit determines in step S200 whether the absolute value $|\theta_i|$ of the angle $\theta_i$ of the vector $V_i$ is larger than a predetermined threshold value $\theta_H$. If YES in step S200, this vector $V_i$ is determined to be a vertical vector. Note that the threshold value $\theta_H$ may be set to fall within the range of 80° to 85°.

If the vertical vector is present on the initial point side, its vector num%her is written in the left vector column 133 in the rectangular vector table in step S163.

Figure 34:
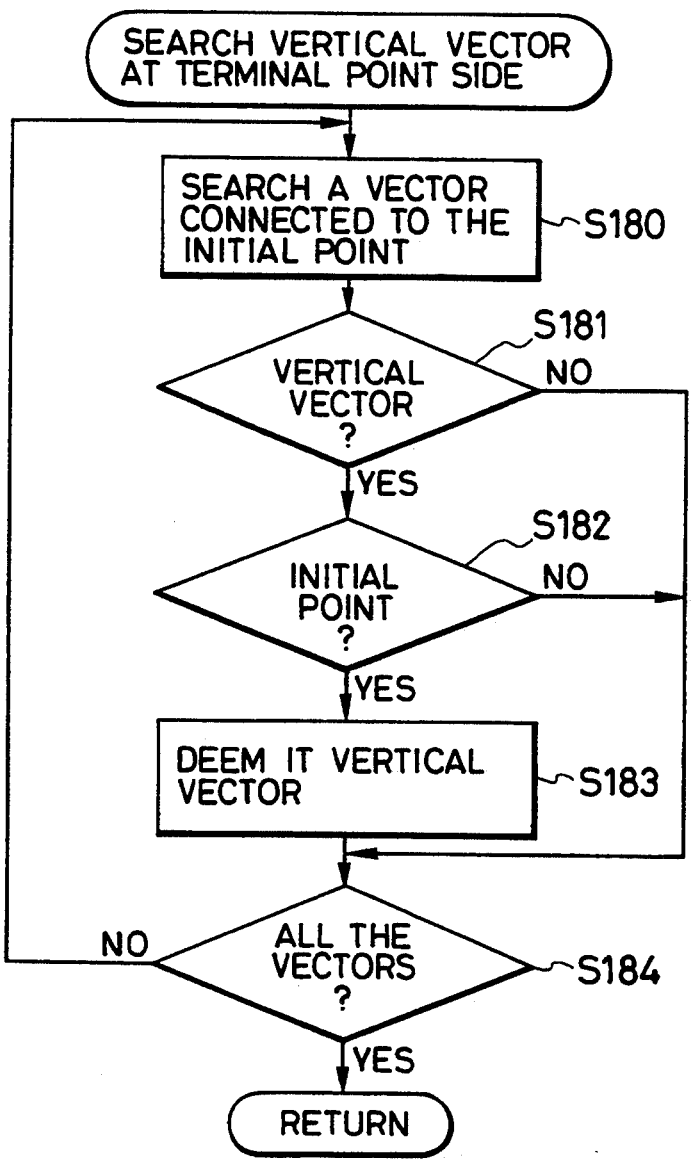
FIG. 34 is a flow chart showing a sub-routine for tracing a vertical vector at the terminal point side.

Vertical vectors are checked on the terminal point side in step S164. An algorithm for retrieving vertical vectors on the terminal point side will be described with reference to a flow chart in FIG. 34. In step S180, vectors connected to the terminal point are extracted from the vector list table.

The CPU circuit determines in step S181 whether the vector is a vertical vector, and in step S182 whether the vector is a vertical vector having the point of interest as the initial point. If YES in step S182, the vector is defined as a vertical vector of interest in step S183. The CPU circuit determines in step S184 whether all vectors commonly connected to the point of interest are checked. If NO in step S184, the flow returns to step S180, and the operations in steps S180 to S184 are repeated.

If any vertical vector is present on the terminal point side, its vector number is written in the right vector column 134 in the rectangular frame vector table in step S165.

If the left and right vectors are obtained, a vector having both end points corresponding to the terminal points of the left and right vectors is searched from the point type vector table 105 in step 166. If such a vector is present, its vector number is written in the lower vector column 135 in the rectangular frame vector table 130 in step S167.

Tilted lines are then searched. A vector having both end points corresponding to the initial point of the left vector and the terminal point of the right vector is searched from the point type vector table 105 in step S168. If such a vector is found, its vector number is written in the column 136 for the vector tilted downward to the right in step S169. Similarly, a vector having end points corresponding to the terminal point of the left vector and the initial point of the right vector is searched from the point type vector table 105 in step S170. If such a vector is present, its vector number is written in the column 137 of the vector tilted upward to the right in step S171.

As described above, at least upper, lower, right, and left vectors are registered as a rectangular frame in the form of the rectangular frame number $W_i$ in the rectangular frame table 131 in step S172. The control variable i is incremented by one in step S173, and the CPU circuit determines in step S174 whether condition i>m is established, i.e., whether or not all the vectors are processed. If NO in step S174, the flow returns to step S161, and the operations in steps S161 to S174 are repeated.

The above operations are repeated to obtain the rectangular vector table 130. If the vector $V_i$ is determined not to be a horizontal vector in step S161, or not to be the left, right, or lower vector in step S162, S164, or S166, the flow advances to step S172. The next vector is then checked.

Figures 29, 30, 31:
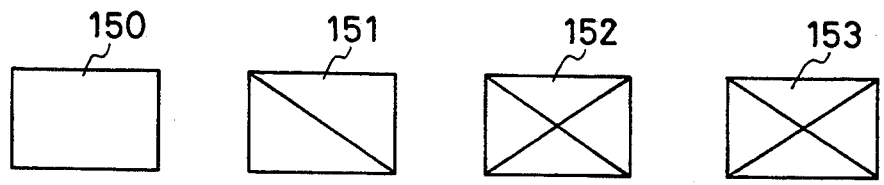
FIG. 29 shows a rectangular frame vector table.
FIG. 30 shows a frame table.
FIG. 31 shows different frames.

It is difficult to reconstruct a frame by using the rectangular frame vector table 130. Each rectangular frame is expressed by coordinate data and size data. As shown in FIG. 30, a frame table 140 consisting of an x-coordinate 142 of the upper left corner point, its y-coordinate 143, its frame width (w) 144, a frame height (h) 145, and a kind (kind) 146 is obtained. The kind of frame represents one of the four kinds shown in FIG. 31 and is represented by any one of values $K_0$, $K_1$, $K_2$, and $K_3$.

$K_0$: frame 150 without a tilted line
$K_1$: frame 151 with only a line tilted downward to the right
$K_2$: frame 152 with only a line tilted upward to the right
$K_3$: frame 153 with both a line tilted downward to the right and a line tilted upward to the right Coordinates x and y, the width w, and the height h are defined as follows:

$$x=(VUP_s)_x, y=(VUP_s)_y$$

$$w=(VUP_e)_x-(VUP_s)_x$$

$$h=(VLEFT_e)_y-(VLEFT_s)_y$$

where $(VUP_s)_x$ is the x-coordinate of the initial point of the upper vector, $(VUP_s)_y$ is the y-coordinate of the initial point of the upper vector, $(VUP_e)_x$ is the x-coordinate of the terminal point of the upper vector, $(VLEFT_e)_y$ is the y-coordinate of the terminal point of the left vector, and $(VLEFT_s)_y$ is the y-coordinate of the initial point of the left vector.

Figure 37:
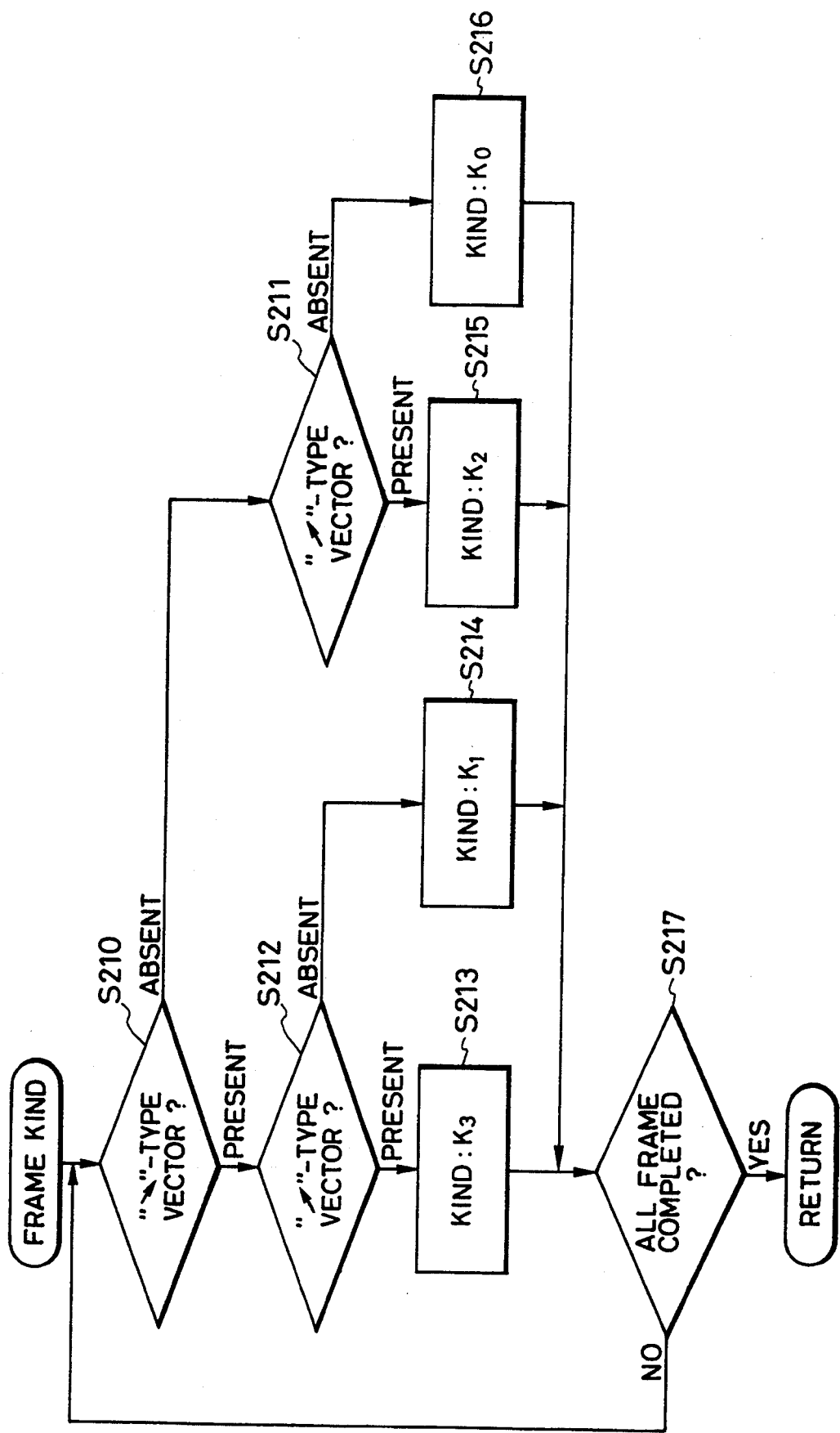
FIG. 37 is a flow chart showing an algorithm for determining the types of frames.
Figure 38:
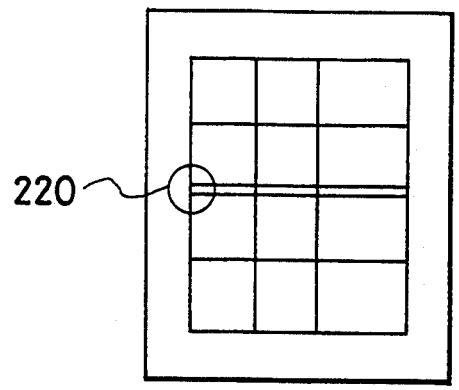
FIG. 38 is a view showing a frame image having a narrow line spacing.

The kind of frame is determined in accordance with a flow chart of FIG. 37, depending on the presence of the vectors tilted upward and downward to the right. Step S210 in FIG. 37 determines the presence/absence of a vector tilted downward to the right. Steps S211 and S212 determine the presence/absence of a vector tilted upward to the right. By a combination of determinations in steps S210 and steps S211 and S212, the kind is determined to be $K_3$ in step S213; $K_1$ in step S214; $K_2$ in step S215; and $K_0$ in step S216. The CPU circuit determines in step S217 whether processing of all the rectangular frames is completed. If NO in step S217, the flow returns to step S210, and the operations in steps S210 to S217 are repeated.

(Frame Making)... Step S36

Printer and floppy output operations are performed on the basis of the resultant frame table 140, and a handwritten frame can be reconstructed as a frame consisting of straight line segments.

In the above embodiment, frame data are obtained on the basis of horizontal vectors. However, the horizontal vector may be replaced with the vertical vector, and an algorithm based on the vertical vector can be used to obtain frame data in the same manner as described above.

As described above, of the set of vectors derived from frame pixels in an input original image, vectors constituting a rectangular frame are extracted to obtain frame data. Therefore, a frame having a complicated structure can be recognized.

Figure 40:
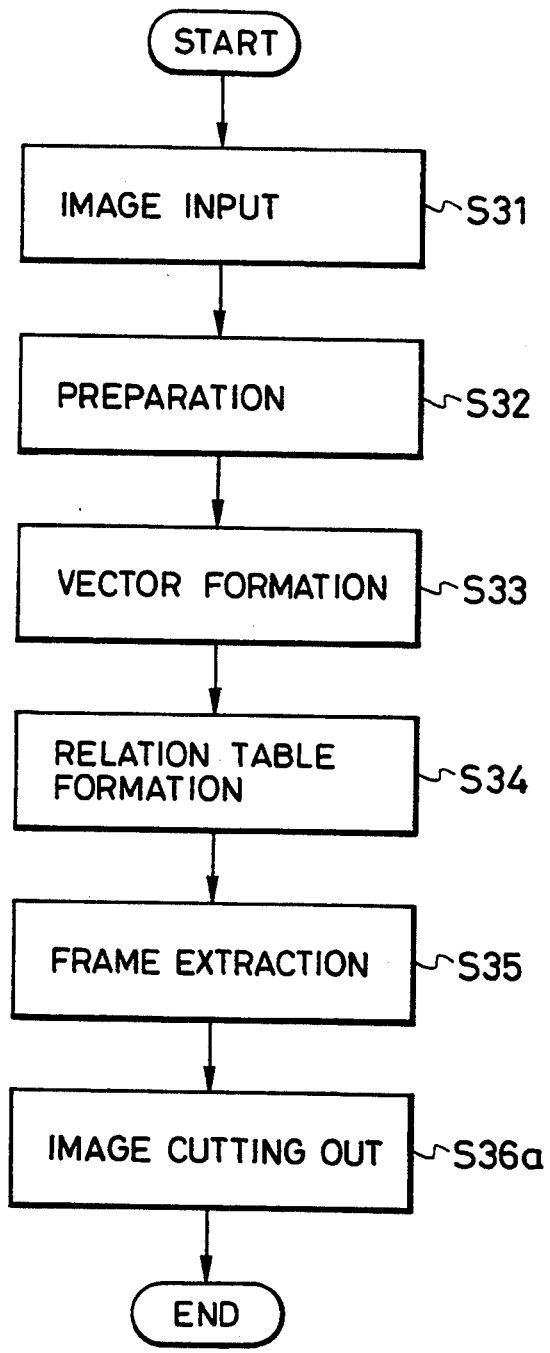
FIG. 40 is a flow chart showing processing for cutting out an image within a frame.
Figure 41:
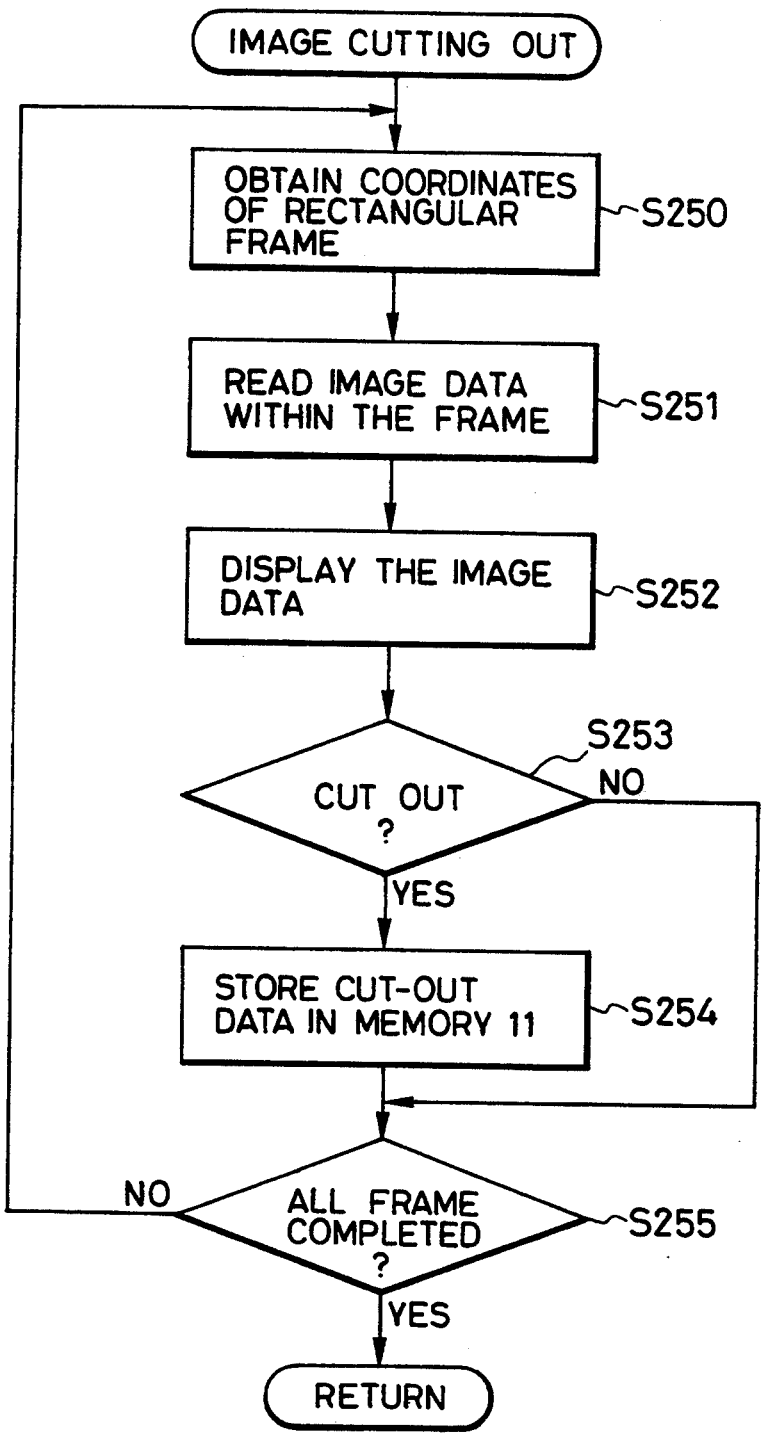
FIG. 41 is a flow chart showing an algorithm for cutting out an image within a frame.

By applying this frame extraction technique, extraction of an image within a frame will be described with reference to FIGS. 39, 40, and 41.

Figure 39:
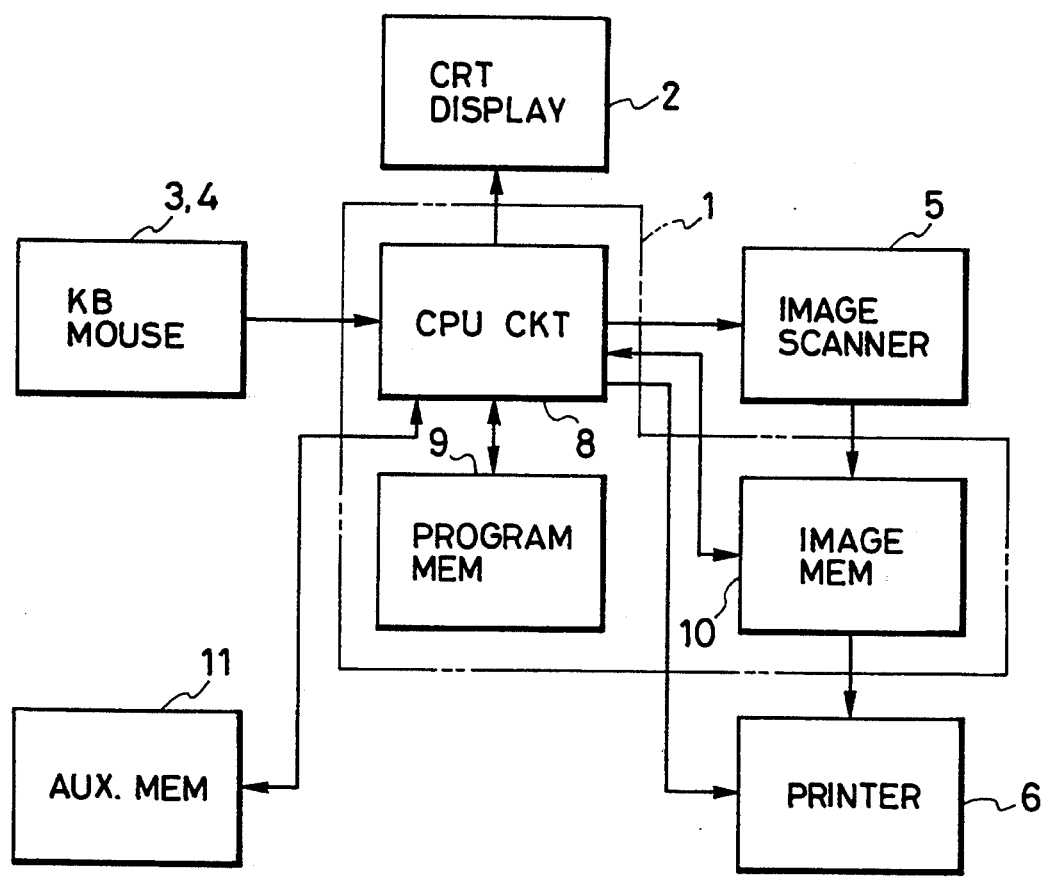
FIG. 39 is a block diagram of an apparatus for cutting out an image within a frame and calculating numerical values for a table.

An auxiliary memory 11 is added in FIG. 39 to the arrangement of FIG. 1 to communicate with the CPU circuit 8 in FIG. 1. The operations in steps S31 to S35 in a flow chart in FIG. 40 are the same as those of FIG. 19. Step S36a is added after step S35 (FIG. 3) in place of step S36.

(Image Cutting-Out)... Step 36a

A cut-out image is stored in the auxiliary memory 11. Cutting-out of an image on the basis of the frame table 140 obtained by frame extraction will be described with reference to the flow chart of FIG. 25. Coordinates of a frame are obtained by using the coordinate data $x_i$ and $y_i$, the width data $w_i$, and the height data $h_i$ from the frame table 140 in step S250. In step S251, of digital image data stored in the image memory 10, rectangular image data surrounded by the frame is fetched by the CPU circuit 8. An image corresponding to the above-mentioned frame including a tilted line may be read out.

In order to allow an operator to check the extraction result, an extracted rectangular image data is displayed on the CRT display 2 in step S252. The CPU circuit then determines in step S253 whether the extracted data is to be cut out. If YES in step S253, the rectangular image data is transferred to the auxiliary memory 11 (e.g., a floppy disk or an optical memory) in step S254. In step S255, the CPU circuit determines whether all rectangular frames are processed. If NO in step S255, the flow returns to step S250, and the operations in steps S250 to S255 are repeated.

If necessary, a command may be input from the keyboard 3 and/or the mouse 4 to display the image data on the CRT display 2 or output it to the printer 6 under the control of the CPU circuit 8.

By cutting out the image, the input original image is processed to generate a table frame consisting of straight lines. A rectangular area defined by the table lines is extracted to automatically cut out an image within this frame. The cutout image can be input to an image processor.

A typical application of cutting-out of the image within the rectangular frame will be exemplified as numeral operations within the frame, as will be described with reference to FIG. 42. The numeral operation apparatus has an arrangement shown in FIG. 39. The auxiliary memory 11 includes a cell table 290 and a character code table 300.

Figure 42:
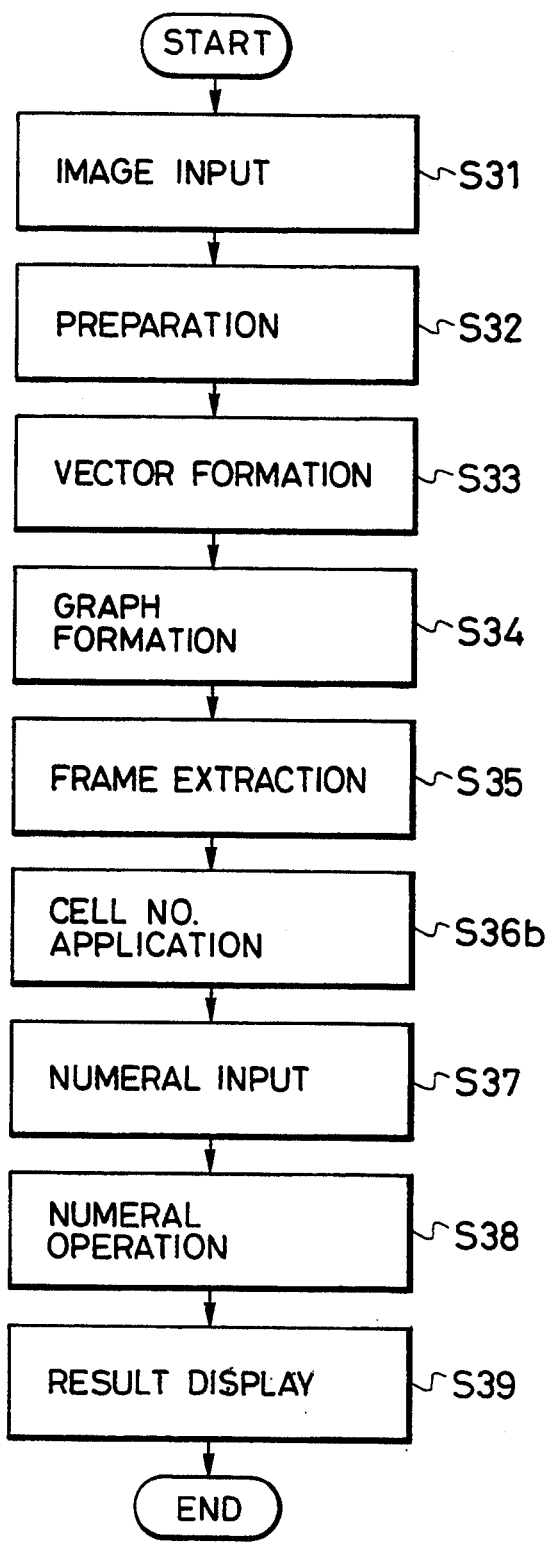
FIG. 42 is a flow chart showing processing for calculating numerical values for a table.

FIG. 42 is a flow chart showing numeral operations within the frame. The operations in steps S31 to S35 are the same as those in FIG. 19. Step S36b is executed in place of step S36, and the operations in steps S37 to S39 continue.

(Cell Number Application)... Step S36b

When extraction by the rectangular frame is completed in steps S31 to S35, cell numbers are applied to the respective frame data in step S36b.

FIG. 43 shows an input image. The input image in FIG. 43 represents a table frame of three rows and five columns. As shown in FIG. 43, the cell numbers are applied as $C_{1,1}$, $C_{1,2}$, ... $C_{1,5}$, $C_{2,1}$, ... $C_{3,5}$. The cell number $C_{1,1}$ is the frame line including a tilted line, as previously described Note that x in $C_{x,y}$ is the row number and y is the column number.

Figure 44:
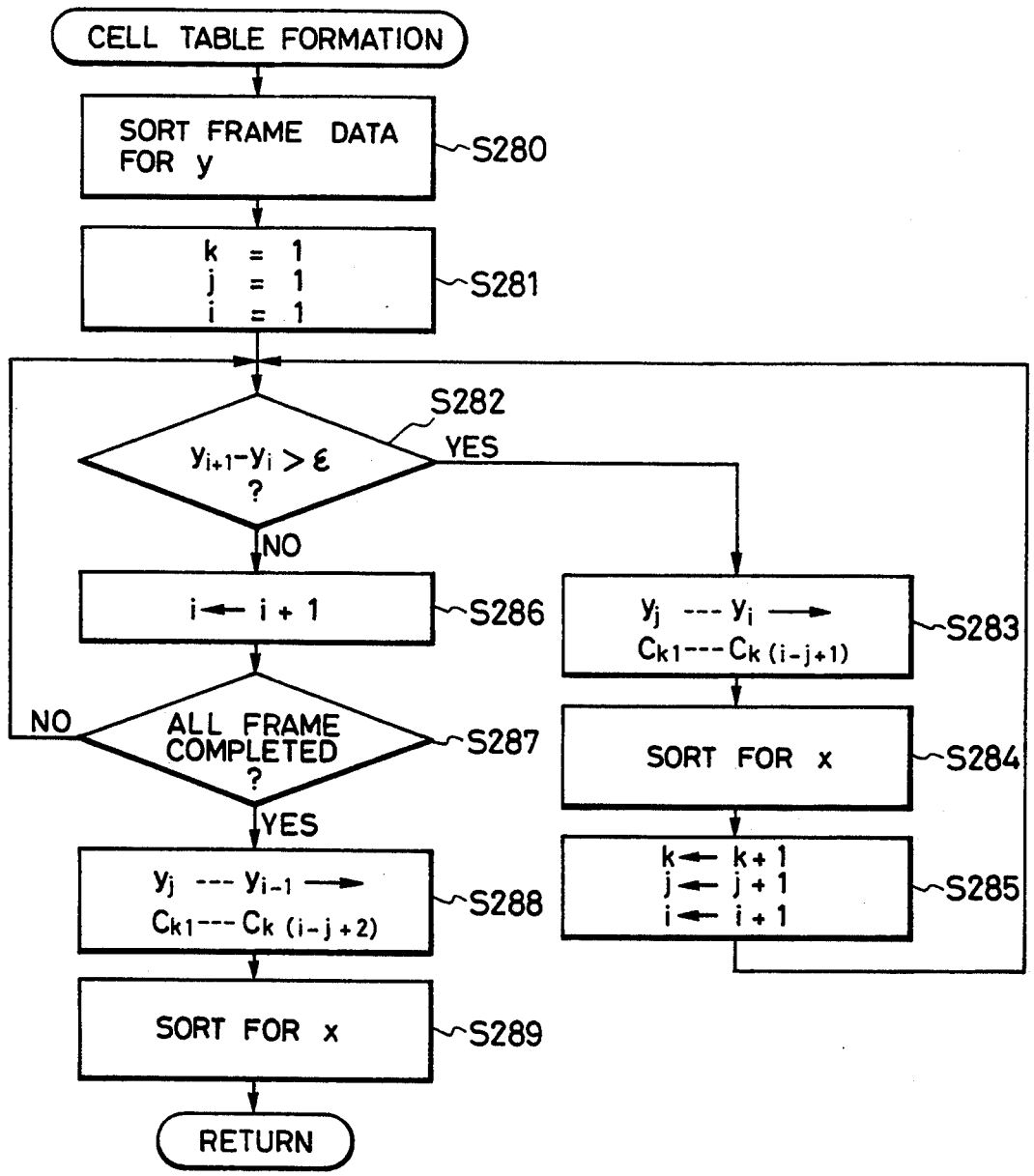
FIG. 44 is a flow chart showing an algorithm for generating a cell table.

An algorithm for applying cell numbers in step S36b in FIG. 42 is shown in a flow chart of FIG. 44. The rectangular frame data are sorted in an order from a smaller value to a larger value with respect to the y-coordinate of the upper left corner point of the rectangular frame. The sorted rectangular frame data are arranged in an order of $y_1 \leq y_2 \leq \ldots \leq y_m$ where m is a total number of frames. The control variables k, j, and i are initialized to 1 in step S281.

Differences $y_{i+1} - y_i$ of the rectangular frame data $y_1$, $y_2, \ldots y_m$ are calculated and compared with a preset threshold value e in step S282. The threshold value is smaller than the width or height of the frame and are defined by pixels corresponding to 3 mm to 5 mm. The threshold value is given as 40 (=5×8) for a digital image of 8 pixels/nun.

If the difference $y_{i+1} - y_i$ is larger than the threshold value, the (i+1)th frame is deemed as a frame of the next row, and the flow advances to step S283. The jth frame to the ith frame are given as $C_{k,1}, C_{k,2}, \ldots C_{k,(i-j+1)}$. The frames of a given row are sorted in accordance with x-coordinates in step S284. The sorted cell numbers are $C_{k,1}, C_{k,2}, \ldots C_{k,(i-j+1)}$. In step S285, the control variables k, j, and i are incremented by one, and the flow returns to step S282. Processing for the next row is started.

If the difference $Y_{i+1} - y_i$ is smaller than the threshold value, the control variable i is incremented by one in step S286. The CPU circuit determines in step S287 whether processing of all rectangular frames is completed. If NO in step S287, the flow returns to step S282. The next rectangular frame is then checked. When processing of all the rectangular frames is completed, no frame to be compared next is present. The same operations as in steps S283 and S284 are performed in steps S288 and S289, and the flow returns to the beginning.

(Numeric Operation Input)... Step S37

The cell table 290 obtained upon completion of cell number application is shown in FIG. 45. The cell table 290 represents the relationship between frame numbers 291 and cell numbers 292. The frame number i corresponding to the cell numbers x and y can be obtained from this table. Coordinates values of the character image area in the cell can be calculated from the frame table 140 shown in FIG. 30. The character image area can be cut out from the original image. A technique for cutting out an image portion character by character from a character image including a plurality of character trains is known to those skilled in the art, and a detailed description thereof will be omitted. Numeral character data obtained by character recognition are stored in a character code table 300 representing the correspondence between a cell 301 and a character code 302 shown in FIG. 46.

The user inputs an operation formula between cells at an input device such as a keyboard or a mouse. For example, the user inputs a +b+c+d at the keyboard.

(Numeral Operation)... Step S38

"10+20+30+40" and "5+10+15+20" are calculated from the character code table 300, in the case shown in FIG. 43.

(Numeral Operation Result Output)... Step S39

Sums "100" and "50" are displayed on the CRT display 2 or recorded by the printer 6. The operation results may be displayed in a blank portion of the same row of the input table or a frame for the calculation result may be added and output.

According to this embodiment, a table frame can be recognized by an input digital original image, cell numbers are added to the frame data in accordance with the positional relationship data, the character image within each cell is recognized, and a desired numeral operation is performed between desired cells. Therefore, easy, high-speed data input and operation can be performed.

According to the present invention, there is provided a frame making apparatus capable of recognizing and reconstructing a frame image having a complicated structure and a frame image including a tilted line or a small line spacing.

What is claimed is:

1. An image processing apparatus comprising:
    line segment extracting means for extracting from an original image a plurality of line segments including characteristic points;
    classifying means for classifying the line segments extracted by said line segment extracting means in accordance with angles between the line segments connected to the characteristic points, wherein said classifying means classifies the line segments into parallel lines, other parallel lines, and tilted lines in accordance with the angles formed between the line segments connected to the characteristic points;
    frame making means for making a frame in accordance with the classification results of said classifying means; and
    numerical operating means for performing an operation on numerical information within the frame made by said frame making means.

2. An apparatus according to claim 1, further comprising a scanner for inputting the original image.

3. An apparatus according to claim 1, further comprising a keyboard for instructing the inputting of the original image.

4. An apparatus according to claim 1, further comprising a cathode ray tube for displaying the frame.

5. An apparatus according to claim 1, further comprising a printer for printing the frame.

6. An image processing apparatus comprising:
    vector forming means for converting an original image into a set of vector line segments having initial and terminal points corresponding to characteristic points comprising end points, contact points, intersections, and branching points;
    rectangle extracting means for extracting vectors defining a rectangle on the basis of a connecting relationship between vector line segments belonging to the set of vector line segments, wherein said rectangle extracting means comprises:
    vector retrieving means for retrieving a horizontal or vertical vector from the vector line segments;
    vector tracing means for tracing a vertical or horizontal vector connected to the horizontal or vertical vector retrieved by said vector retrieving means, thereby extracting the vectors defining the rectangle; and
    numerical operating means for performing an operation on numerical information within each rectangle extracted by said rectangle extracting means in accordance with the position of said each rectangle.

7. An image processing apparatus according to claim 6, wherein said rectangular extracting means further extracts a tilted line.

8. An apparatus according to claim 6, further comprising a scanner for inputting the original image.

9. An apparatus according to claim 6, further comprising a keyboard for instructing the inputting of the original image.

10. An apparatus according to claim 6, further comprising frame making means for making a frame in accordance with the extracted rectangle.

11. An apparatus according to claim 10, further comprising a cathode ray tube for displaying the frame.

12. An apparatus according to claim 10, further comprising a printer for printing the frame.

13. An image processing apparatus comprising:
line segment extracting means for extracting from an original image a plurality of line segments including characteristic points;
line segments selecting means for selecting line segments connected to one of the plurality of extracted characteristic points;
classifying means for classifying the line segments selected by said line segments selecting means in accordance with angles between the selected line segments;
storage means for storing classification results of said classifying means with the respective extracted line segments;
frame making means for making a frame in accordance with the stored classification result; and
numerical operating means for performing an operation on numerical information within the frame made by said frame making means.

14. An apparatus according to claim 13, wherein said classifying means classifies the line segments into parallel lines and tilted lines.

15. An apparatus according to claim 13, wherein the one of the plurality of characteristic points is a bent point.

16. An apparatus according to claim 13, wherein the one of the plurality of characteristic points is an intersection point.

17. An apparatus according to claim 13, wherein the one of the plurality of characteristic points is a branching point.

18. An apparatus according to claim 13, further comprising a scanner for inputting the original image.

19. An apparatus according to claim 13, further comprising a keyboard for instructing the inputting of the original image.

20. An apparatus according to claim 13, further comprising a cathode ray tube for displaying the frame.

21. An apparatus according to claim 13, further comprising a printer for printing the frame.

22. An image processing apparatus comprising:
line segment extracting means for extracting from an original image a plurality of line segments including characteristic points;
line segments selecting means for selecting line segments connected to one of the plurality of extracted characteristic points;
classifying means for classifying the line segments selected by said line segments selecting means in accordance with lengths of the selected line segments;
storage means for storing classification results of said classifying means with the respective extracted line segments;
frame making means for making a frame in accordance with the stored classification result; and
numerical operating means for performing an operation on numerical information within the frame made by said frame making means.

23. An apparatus according to claim 22, wherein said classifying means classifies the line segments into parallel lines and tilted lines.

24. An apparatus according to claim 22, wherein the one of the plurality of characteristic points is a bent point.

25. An apparatus according to claim 22, wherein the one of the plurality of characteristic points is an intersection point.

26. An apparatus according to claim 22, wherein the one of the plurality of characteristic points is a branching point.

27. An apparatus according to claim 22, further comprising a scanner for inputting the original image.

28. An apparatus according to claim 22, further comprising a keyboard for instructing the inputting of the original image.

29. An apparatus according to claim 22, further comprising a cathode ray tube for displaying the frame.

30. An apparatus according to claim 22, further comprising a printer for printing the frame.

31. An image processing apparatus comprising:
vector forming means for converting an original image into a plurality of vector line segments;
vector storing means for storing characteristic points including an initial point and a terminal point of each vector line segment converted by said vector forming means;
rectangle extracting means for extracting vectors defining a rectangle on the basis of a connecting relationship between vector line segments belonging to the stored vector line segments, wherein said rectangle extracting means comprises:
vector retrieving means for retrieving a horizontal or vertical vector from the vector line segments;
vector tracing means for tracing a vector having the same point data as the characteristic points of the retrieved vector, thereby extracting the vectors defining the rectangle; and
numerical operation means for performing an operation on numerical information within each rectangle extracted by said rectangle extracting means in accordance with the position of said each rectangle.

32. An apparatus according to claim 31, further comprising frame making means for making a frame in accordance with the extracted rectangle.

33. An apparatus according to claim 31, wherein the one of the plurality of characteristic points is a bent point.

34. An apparatus according to claim 31, wherein the one of the plurality of characteristic points is an intersection point.

35. An apparatus according to claim 31, wherein the one of the plurality of characteristic points is a branching point.

36. An apparatus according to claim 31, further comprising a scanner for inputting the original image.

37. An apparatus according to claim 31, further comprising a keyboard for instructing the inputting of the original image.

38. An apparatus according to claim 32, further comprising a cathode ray tube for displaying the frame.

39. An apparatus according to claim 32, further comprising a printer for printing the frame.

40. A method for processing an image comprising the steps of:
   extracting from an original image a plurality of line segments including characteristic points;
   classifying the line segments extracted in said line segment extracting step in accordance with angles between the line segments connected to the characteristic points, wherein said classifying step classifies the line segments into parallel lines, other parallel lines, and tilted lines in accordance with the angles formed between the line segments connected to the characteristic points;
   making a frame in accordance with the classification results of said classifying step; and
   performing an operation on numerical information within the frame made in said frame making step.

41. A method according to claim 40, further comprising the step of inputting the original image with a scanner.

42. A method according to claim 40, further comprising the step of instructing the inputting of the original image with a keyboard.

43. A method according to claim 40, further comprising the step of displaying the frame with a cathode ray tube.

44. A method according to claim 40, further comprising the step of printing the frame with a printer.

45. An image processing method comprising the steps of:
   converting an original image into a set of vector line segments having initial and terminal points corresponding to characteristic points comprising end points, contact points, intersections, and branching points;
   extracting vectors defining a rectangle on the basis of a connecting relationship between vector line segments belonging to the set of vector line segments, wherein said rectangle extracting step comprises the steps of:
   retrieving a horizontal or vertical vector from the vector line segments; and
   tracing a vertical or horizontal vector connected to the horizontal or vertical vector retrieved in said vector retrieving step, thereby extracting the vectors defining the rectangle; and
   performing an operation on numerical information within each rectangle extracted in said rectangle extracting step in accordance with the position of each rectangle.

46. A method according to claim 45, further comprising the step of inputting the original image with a scanner.

47. A method according to claim 45, further comprising the step of instructing the inputting of the original image with a keyboard.

48. A method according to claim 45, further comprising the step of making a frame in accordance with the extracted rectangle.

49. A method according to claim 48, further comprising the step of displaying the frame with a cathode ray tube.

50. A method according to claim 48, further comprising the step of printing the frame with a printer.

51. A method according to claim 45, wherein said rectangular extracting step further comprises the step of extracting a tilted line.

52. An image processing method comprising the steps of:
   extracting from an original image a plurality of line segments including characteristic points;
   selecting line segments connected to one of the plurality of extracted characteristic points;
   classifying the line segments selected in said line segments selecting step in accordance with angles between the selected line segments;
   storing classification results of said classifying step with the respective extracted line segments;
   making a frame in accordance with the stored classification result; and
   performing an operation on numerical information within the frame made in said frame making step.

53. A method according to claim 52, wherein said classifying step classifies the line segments into parallel lines and tilted lines.

54. A method according to claim 52, wherein the one of the plurality of characteristic points is a bent point.

55. A method according to claim 52, wherein the one of the plurality of characteristic points is an intersection point.

56. A method according to claim 52, wherein the one of the plurality of characteristic points is a branching point.

57. A method according to claim 52, further comprising the step of inputting the original image with a scanner.

58. A method according to claim 52, further comprising the step of instructing the inputting of the original image with a keyboard.

59. A method according to claim 52, further comprising the step of displaying the frame with a cathode ray tube.

60. A method according to claim 59, further comprising the step of printing the frame with a printer.

61. An image processing method comprising the steps of:
   extracting from an original image a plurality of line segments including characteristic points;
   selecting line segments connected to one of the plurality of extracted characteristic points;
   classifying the line segments selected in said line segments selecting step in accordance with lengths of the selected line segments;
   storing classification results of said classifying step with the respective extracted line segments;
   making a frame in accordance with the stored classification result; and
   performing an operation on numerical information within the frame made in said frame making step.

62. A method according to claim 61, wherein said classifying step classifies the line segments into parallel lines and tilted lines.

63. A method apparatus according to claim 63, wherein the one of the plurality of characteristic points is a bent point.

64. A method according to claim 61, wherein the one or the plurality of characteristic points is an intersection point.

65. A method according to claim 61, wherein the one of the plurality of characteristic points is a branching point.

66. A method according to claim 61, further comprising the step of inputting the original image with a scanner.

67. A method according to claim 61, further comprising the step of instructing the inputting of the original image with a keyboard.

68. A method according to claim 61, further comprising the step of displaying the frame with a cathode ray tube.

69. A method according to claim 61, further comprising the step of printing the frame with a printer.

70. An image processing method comprising the steps of:
- converting an original image into a plurality of vector line segments;
- storing characteristic points including an initial point and a terminal point of each vector line segment converted in said vector forming step;
- extracting vectors defining a rectangle on the basis of a connecting relationship between vector line segments belonging to the stored vector line segments, wherein said rectangle extracting step comprises the steps of:
  - retrieving a horizontal or vertical vector from the vector line segments;
  - tracing a vector having the same point data as the characteristic points of the retrieved vector, thereby extracting the vectors defining the rectangle; and
- performing an operation on numerical information within each rectangle extracted in said rectangle extracting step in accordance with the position of each rectangle.

71. A method according to claim 70, further comprising the step of making a frame in accordance with the extracted rectangle.

72. A method according to claim 70, wherein the one of the plurality of characteristic points is a bent point.

73. A method according to claim 70, wherein the one of the plurality of characteristic points is an intersection point.

74. A method according to claim 70, wherein the one of the plurality of characteristic points is a branching point.

75. A method according to claim 70, further comprising the step of inputting the original image with a scanner.

76. A method according to claim 70, further comprising the step of instructing the inputting of the original image with a keyboard.

77. A method according to claim 71, further comprising the step of displaying the frame with a cathode ray tube.

78. A method according to claim 71, further comprising the step of printing the frame with a printer.

* * * * *

UNITED STATES PATENT AND TRADEMARK OFFICE
CERTIFICATE OF CORRECTION

PATENT NO. : 5,347,598
DATED : September 13, 1994
INVENTOR(S) : MASAMI OGAWA

It is certified that error appears in the above-indentified patent and that said Letters Patent is hereby corrected as shown below:

COLUMN 1

Line 13, "aft" should read --an--.
Line 16, "free." should read --frame.--.
Line 37, "lines" should read --lines,--.
Line 43, "Tilted line: $\theta_{th} \geq |\theta| < 90° - \theta_{th}$" should read --Tilted line: $\theta_{th} \leq |\theta| < 90° - \theta_{th}$--.

COLUMN 3

Line 57, "REFERRED" should read --PREFERRED--.

COLUMN 9

Line 15, "$|\theta_{1,3} > 85°$" should read --$|\theta_{1,3}| > 85°$--.
Line 24, "$|\theta_{2,3} < 85°$," should read --$|\theta_{2,3}| < 85°$--.
Line 31, "$|\theta_3 > 85°$," should read --$|\theta_3| > 85°$,--.

COLUMN 10

Line 17, "numeral" should read --numerical--.
Line 38, "R3LM" should read --RAM--.

COLUMN 14

Line 2, "determines-in" should read --determines in--.
Line 20, "nun%her" should read --number--.

COLUMN 16

Line 49, "numeral" should read --numerical--.
Line 54, "numeral" should read --numerical--.

UNITED STATES PATENT AND TRADEMARK OFFICE
CERTIFICATE OF CORRECTION

PATENT NO. : 5,347,598 Page 2 of 2
DATED : September 13, 1994
INVENTOR(S) : MASAMI OGAWA It is certified that error appears in the above-indentified patent and that said Letters Patent is hereby corrected as shown below:

COLUMN 17

Line 1, "described" should read --described.--.
Line 14, "value e" should read --value $\varepsilon$--.
Line 18, "8 pixels/nun." should read --8 pixels/mm.--.
Line 30, "$Y_{i+1}-Y_i$" should read --$y_{i+1}-y_i$--.

COLUMN 22

Line 42, "claim 59," should read --claim 52,--.
Line 62, "apparatus" should be deleted; and "claim 63," should read --claim 61,--.
Line 67, "or" should read --of--.

Signed and Sealed this

Seventh Day of February, 1995

Attest:

BRUCE LEHMAN

*Attesting Officer*   *Commissioner of Patents and Trademarks*